United States Patent
Kawai

(10) Patent No.: US 7,633,542 B2
(45) Date of Patent: Dec. 15, 2009

(54) DIGITAL CAMERA SYSTEM HAVING PLURAL CAMERA BODIES INCLUDING IMAGE PICKUP ELEMENTS OF DIFFERENT PIXEL PITCHES RESPECTIVELY AND ENABLING USE OF A COMMON INTERCHANGEABLE LENS

(75) Inventor: Sumio Kawai, Hachioji (JP)

(73) Assignee: Olympus Corporation, Tokyo (JP)

( * ) Notice: Subject to any disclaimer, the term of this patent is extended or adjusted under 35 U.S.C. 154(b) by 574 days.

(21) Appl. No.: 11/067,772

(22) Filed: Feb. 28, 2005

(65) Prior Publication Data

US 2005/0174467 A1    Aug. 11, 2005

Related U.S. Application Data

(63) Continuation-in-part of application No. 10/600,363, filed on Jun. 20, 2003, now Pat. No. 7,414,660.

(30) Foreign Application Priority Data

Oct. 27, 2004    (JP)    ............................. 2004-312846

(51) Int. Cl.
*H04N 5/228* (2006.01)
(52) U.S. Cl. .................................................. 348/335
(58) Field of Classification Search ................. 348/335
See application file for complete search history.

(56) References Cited

U.S. PATENT DOCUMENTS

| | | | | |
|---|---|---|---|---|
| 2,693,735 A | * | 11/1954 | Zehender | 356/512 |
| 4,227,208 A | * | 10/1980 | Takanashi et al. | 359/890 |
| 4,682,237 A | | 7/1987 | Kato et al. | |
| 4,952,013 A | * | 8/1990 | Harada et al. | 359/328 |
| 5,091,795 A | * | 2/1992 | Nishioka et al. | 349/1 |
| 5,471,343 A | * | 11/1995 | Takasugi | 359/494 |
| 5,499,069 A | | 3/1996 | Griffith | |

(Continued)

FOREIGN PATENT DOCUMENTS

EP    1109036 A1    6/2001

(Continued)

OTHER PUBLICATIONS

Office Action, a Notice of Denial, for Japanese Patent Application No. 2004-312846, dated Jun. 2, 2009.*

*Primary Examiner*—Tuan Ho
*Assistant Examiner*—Kent Wang
(74) *Attorney, Agent, or Firm*—Volpe and Koenig, P.C.

(57) ABSTRACT

A digital camera system including a plurality of digital cameras, each including a plurality of interchangeable-lens barrels having the same specification, a first camera body allowing the interchangeable-lens barrel to be attached thereto, or a second camera body. The first camera body includes an image pickup element having a first pixel pitch and a first optical unit including an optical low-pass filter with a thickness based on the pixel pitch. The second camera body includes an image pickup element having a second pixel pitch smaller than the first pixel pitch, and a second optical unit including a second optical low-pass filter. The second optical low-pass filter includes a crystal plate as a depolarization plate of a thickness so that the optical path length of the second camera body is substantially equal to the optical path of the first optical low-pass filter.

2 Claims, 18 Drawing Sheets

U.S. PATENT DOCUMENTS

| | | | |
|---|---|---|---|
| 5,602,682 A | 2/1997 | Ito et al. | |
| 5,684,293 A | 11/1997 | Kessler | |
| 5,781,236 A * | 7/1998 | Shinbori et al. | 348/342 |
| 5,907,358 A * | 5/1999 | Tatsumi | 348/312 |
| 5,940,127 A * | 8/1999 | Nakajima | 348/342 |
| 6,157,781 A | 12/2000 | Konno et al. | |
| 6,327,085 B1 | 12/2001 | Osawa et al. | |
| 6,449,013 B1 | 9/2002 | Suzuki et al. | |
| 6,577,341 B1 * | 6/2003 | Yamada et al. | 348/272 |
| 6,583,819 B2 | 6/2003 | Ito et al. | |
| 6,600,564 B1 * | 7/2003 | Wang et al. | 356/484 |
| 6,650,474 B2 * | 11/2003 | Osawa | 359/495 |
| 6,798,586 B1 | 9/2004 | Lyon et al. | |
| 6,963,448 B1 * | 11/2005 | Hayakawa | 359/494 |
| 7,088,521 B2 * | 8/2006 | Hamano et al. | 359/686 |
| 7,193,651 B2 | 3/2007 | Kato | |
| 2001/0010594 A1 * | 8/2001 | Oono | 359/497 |
| 2001/0052968 A1 * | 12/2001 | Shiozawa | 355/53 |
| 2001/0053288 A1 * | 12/2001 | Ito et al. | 396/429 |
| 2001/0055072 A1 * | 12/2001 | Mogamiya et al. | 348/335 |
| 2002/0057358 A1 * | 5/2002 | Kimura | 348/335 |
| 2002/0168116 A1 * | 11/2002 | Takayama et al. | 382/275 |
| 2002/0171750 A1 * | 11/2002 | Kato | 348/345 |
| 2003/0063381 A1 * | 4/2003 | Abe | 359/410 |
| 2003/0184883 A1 * | 10/2003 | Sato et al. | 359/784 |
| 2004/0042078 A1 * | 3/2004 | Osawa et al. | 359/495 |
| 2005/0073751 A1 * | 4/2005 | Mihara | 359/680 |
| 2005/0174467 A1 * | 8/2005 | Kawai | 348/335 |

FOREIGN PATENT DOCUMENTS

| | | | |
|---|---|---|---|
| GB | 2280756 A | | 2/1995 |
| GB | 2372580 A | | 8/2002 |
| JP | 63239429 | | 5/1988 |
| JP | 07-023404 | | 1/1995 |
| JP | 07123421 | | 5/1995 |
| JP | 2000-101886 | | 4/2000 |
| JP | 2000-214415 | | 8/2000 |
| JP | 2000244821 | | 9/2000 |
| JP | 2001-147404 | | 5/2001 |
| JP | 3370440 | | 11/2002 |
| JP | 2003-215449 | * | 7/2003 |
| JP | 2003-279852 | * | 10/2003 |
| JP | 2004-112661 | | 4/2004 |

\* cited by examiner

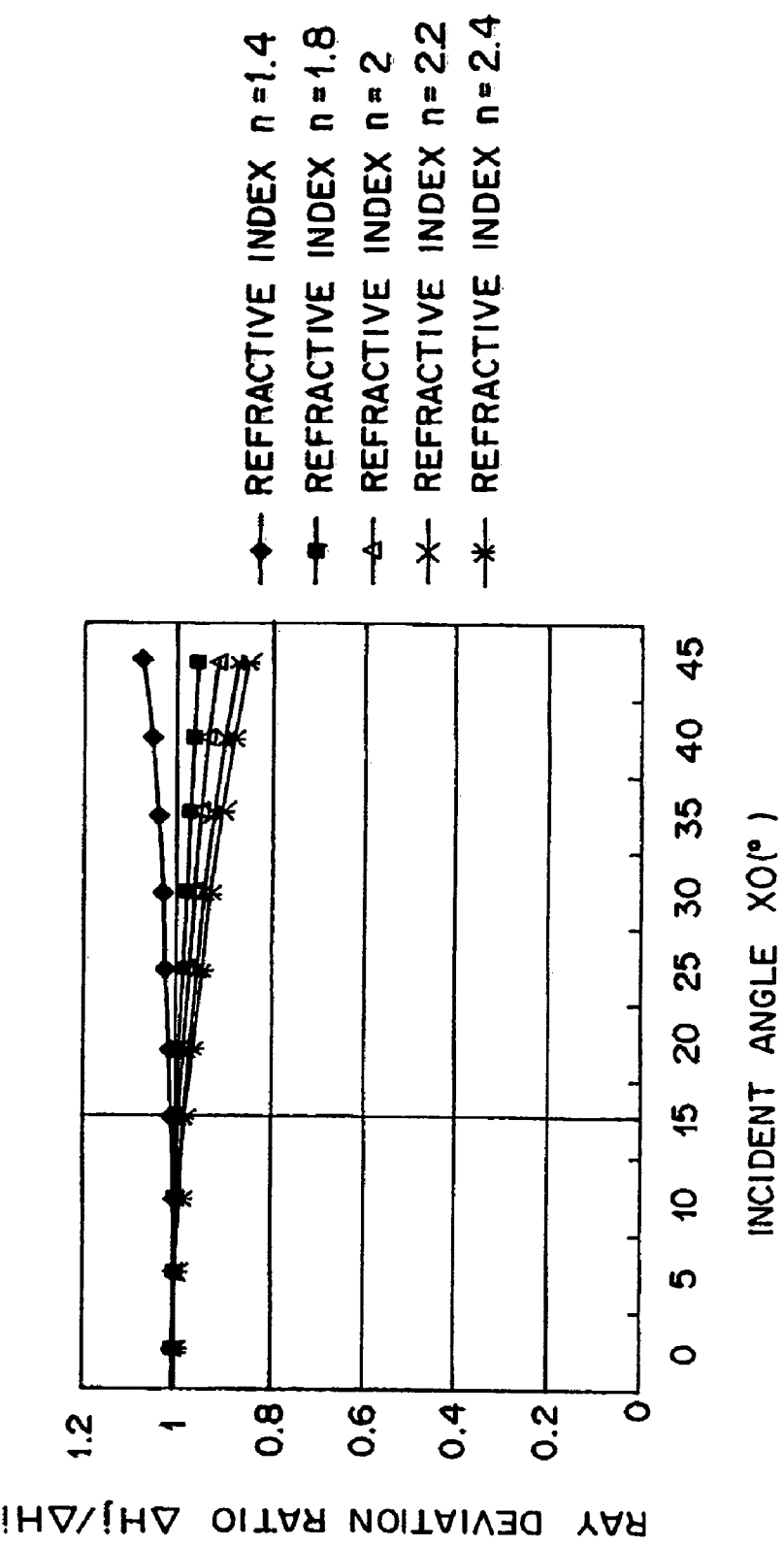

F I G. 1 3
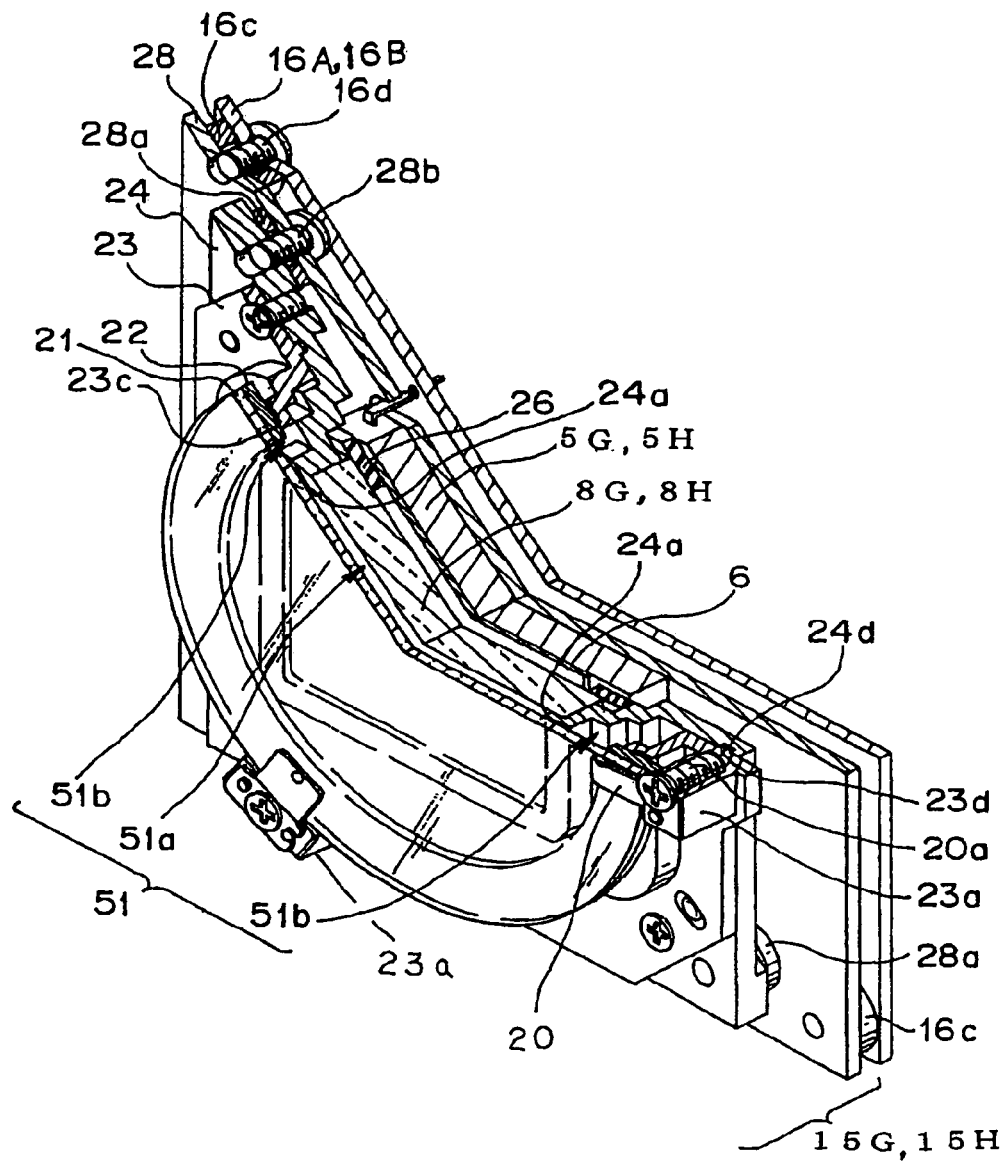

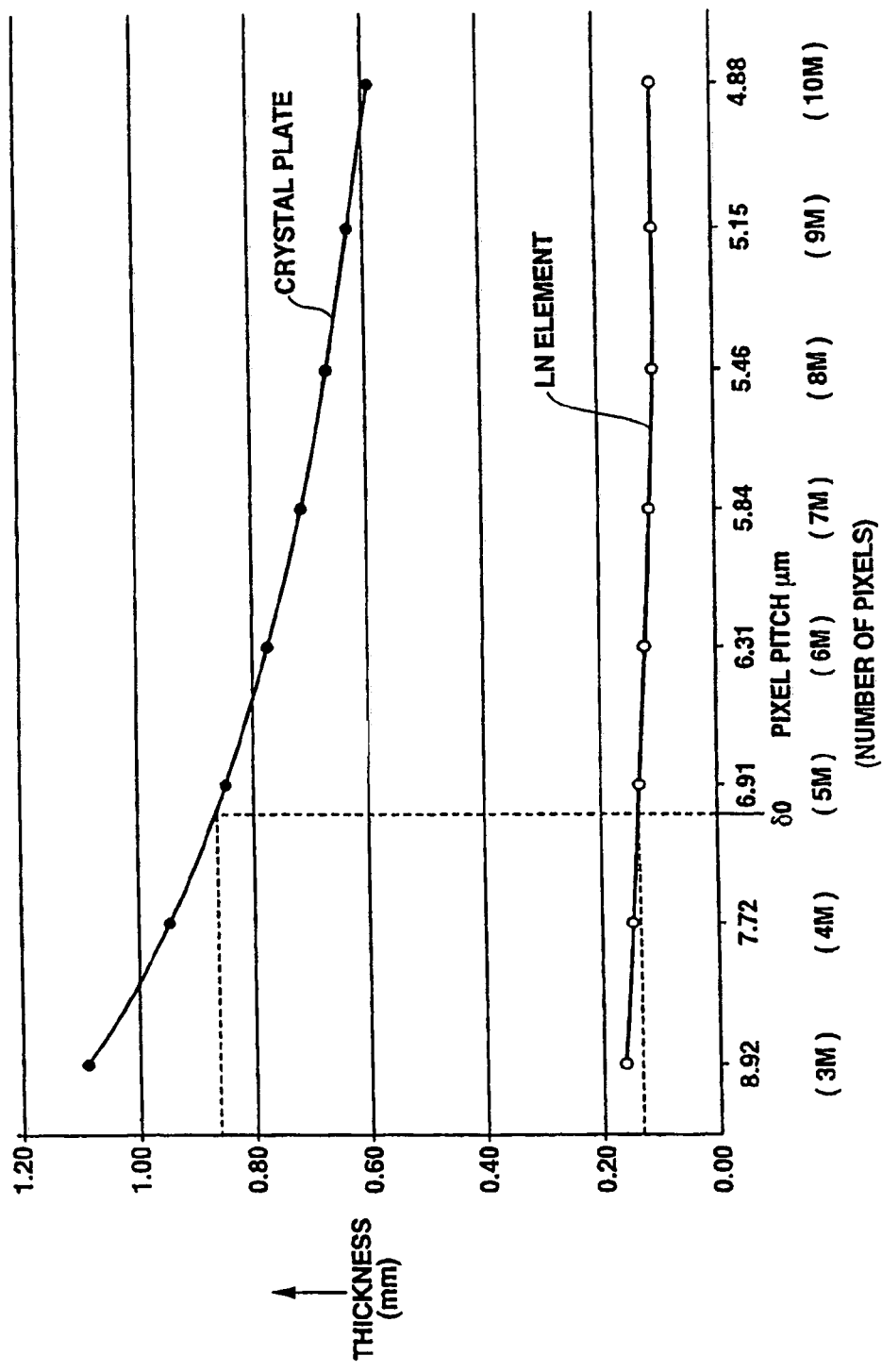

DIGITAL CAMERA SYSTEM HAVING PLURAL CAMERA BODIES INCLUDING IMAGE PICKUP ELEMENTS OF DIFFERENT PIXEL PITCHES RESPECTIVELY AND ENABLING USE OF A COMMON INTERCHANGEABLE LENS

CROSS REFERENCE TO RELATED APPLICATION

This application is a continuation-in-part of application Ser. No. 10/600,363 filed on Jun. 2, 2003, now pending, and claims benefit of Japanese Applications No. 2003-135005 filed in Japan on May 13, 2003 and No. 2004-312846 filed in Japan on Oct. 27, 2004 the contents of which are incorporated by this reference.

BACKGROUND OF THE INVENTION

1. Field of the Invention

The present invention relates to a lens-interchangeable digital camera system and an interchangeable lens.

2. Description of the Related Art

Known digital cameras use an optical low-pass filter (hereinafter referred to as an optical LPF) of crystal or the like, having double refraction, arranged in front of an image pickup element to reduce false color (such as moiré) of a high-frequency component of a shot image. A single-lens reflex digital camera having a lens (a lens barrel) interchangeable with respect to a camera body includes image pickup elements different in pixel number namely in pixel pitch so that a plurality of interchangeable lenses within the same specification are mounted.

In the single lens reflex digital camera body, the optical LPF having a thickness responsive to a pixel pitch is mounted in front of the image pickup device having a different pixel pitch.

The thickness of the optical LPF is thus determined in accordance with the pixel pitch of the image pickup element. It is because rays of light transmitted through the optical low-pass filter are split into a plurality of rays by the double refraction property of an optical member forming the optical low-pass filter and the amount of splitting depends on the thickness of the optical member. To reduce the generation of moiré, a spatial frequency component of an image approximately matching the pixel pitch of the image pickup element needs to be eliminated. To this end, the amount of splitting of the rays of light must be set to be substantially equal to the pixel pitch. The thickness of the optical low-pass filter thus must be varied in accordance with the pixel pitch.

If the optical LPF having a different thickness is mounted in front of the image pickup element, the forming position of an image is moved. FIG. 17 is an optical path diagram illustrating the image-forming position that changes in response to the presence or absence of the optical LPF arranged in front of the image pickup element in a photographic optical system. A plane plate is arranged between the interchangeable lens and the image pickup element. The plane plate is a protection glass or the like that hermetically seals a dust-preventive filter, an infrared absorbing glass, and the image pickup element.

When an optical LPF 102 is not provided in front of an image pickup surface 103 of an image pickup element as shown in FIG. 17, the center luminous flux having passed through a lens 101 forms an image at a point P1 on the image pickup surface 103. A peripheral luminous flux having passed through the lens 101 forms an image at a point P2 on the image pickup surface 103. However, when the optical LPF 102 is provided in front of the image pickup surface 103 of the image pickup element, the center luminous flux having passed through the lens 101 forms an image at a point P1' behind the image pickup surface 103. The peripheral luminous flux having passed through the lens 101 form an image at a point P2' behind the image pickup surface 103. When the optical filter 103 is thicker, the luminous flux forms an image in a more rear direction. In other words, the effective optical path length of a luminous flux to the image-forming position depends on the thickness of the optical LPF. In a digital camera system having a plurality of camera bodies, the effective optical path length varies if the optical elements, such as the dust-preventive filter, the infrared absorbing glass, and the protection glass, used in the camera body change in thickness, or if the optical refractive indices vary, or if some optical elements are not used at all.

The optical length generally differs between a luminous flux incident on the center of the photographic screen and a luminous flux incident on the edge portion of the photographic screen in a photographic optical system of a digital camera, generating a curvature-of-the-field aberration as a result. The difference in optical path length of the center and edge portion of the photographic screen can be corrected by providing an optical unit formed by particular optical elements in the photographic optical system with an optical characteristic for canceling an aberration such as curvature of the field to correct the curvature of the field, spherical aberration, astigmatism or the like, as a result. In this way, an image is formed on the image pickup element.

However, when the aberration correction is applied to the lens interchangeable type single lens reflex digital camera body, the problem below may arise. That is to say, in a digital camera system including a first camera body having a first optical unit and an interchangeable lens designed for the first camera body, the interchangeable lens may be mounted on a second camera body having a second optical unit. The camera bodies are different from each other in effective optical path length because the optical elements of the first and second optical units are different in refractive index and thickness, and because a particular optical element is not used. The aberrations, such as the curvature of the field, cannot be appropriately corrected. More specifically, when an image pickup device is mounted, the thickness of the optical LPF needs to be adjusted to match the pixel pitch.

In known single lens reflex digital cameras, a lithium niobate (LN, $LiNbO_3$) element is used instead of the crystal plate and the LN is significantly thin and larger in double refraction than the crystal plate. The number of pixels is changed by modifying the size of the image pickup device in order to keep the pixel pitch as it is. Because of its large double refraction, even a thin LN element permits the interchangeable lens to be used among the digital camera bodies different in pixel pitch without changing the effective optical path length of the luminous flux.

FIG. 18 is a plot of a relationship between a pixel pitch of the image pickup device (the number of pixels in the image pickup device) and a thickness of the optical LPF (for the crystal and LN element). As shown in FIG. 18, the thickness of the usable optical LPF becomes thinner as the pixel pitch P becomes narrower. Given the same pixel pitch P, the thickness of the usable LN element is about ⅕ to ⅙ of the thickness of the crystal.

Techniques to control effective optical path length using the optical LPF and to control spatial frequency characteristic in known digital cameras are disclosed in Japanese Unexamined Patent Application Publications Nos. 7-123421, 2000-244821, and 2004-112661 and Japanese Patent No. 2552855.

An image pickup device disclosed in Japanese Unexamined Patent Application Publication No. 7-123421 includes a switch circuit that switches between a first image pickup mode for forming a natural color image signal using an electronic signal outputted from an image pickup element and a second image pickup mode for forming an image signal having a high resolution with respect to a single color-or monochrome image. In response to the switching action, the optical LPF is inserted or retreated, and a variation in the effective optical path length is corrected by another optical system. The image pickup device provides a high-resolution image signal of a monochrome image.

An image pickup device disclosed in Japanese Unexamined Patent Application Publication No. 2000-244821 switches between an optical path compensating dummy glass in an LPF block and an optical LPF in response to a drive mode of an image pickup element. The image pickup device efficiently controls the generation of a false signal generated by a change in spatial sampling characteristics caused by a special driving of an image pickup element.

In an image pickup device disclosed in Japanese Patent No. 2552855, compensating optical means having the same effective optical path length as the optical LPF is inserted into an optical path instead of the optical LPF when a frame read mode is selected. The image pickup device is free from aliasing distortion even if sampling vertical scanning frequency is changed from 525 to 262.5. Image quality is thus maintained.

In accordance with a technique disclosed in Japanese Unexamined Patent Application Publication No. 2004-112661, a plurality of optical plane-parallel members are arranged on light incident sides of a plurality of image pickup devices having respectively image pickup elements different in pixel pitch. The sum of thicknesses of the plurality of optical members along an optical axis is set to be equal among the plurality of image pickup elements. The spherical aberration and astigmatism of an interchangeable lens thus remains unchanged among image pickup devices.

SUMMARY OF THE INVENTION

Accordingly, it is an object of the present invention to provide a digital camera system, and an interchangeable lens for use in the digital camera system for providing an image free from a curvature-of-the-field aberration, a spherical aberration, and astigmatism among camera bodies having image pickup elements different in pixel pitch.

A digital camera system of the present invention having an interchangeable lens, and first and second camera bodies, each camera body allowing the interchangeable lens to be attached thereto, includes: a first image pickup element arranged in the first camera body; a first optical unit arranged in front of the first image pickup element in the first camera body, the first optical unit including a plurality of optical elements such as a first optical low-pass filter; a second image pickup element arranged in the second camera body, the second image pickup element being different in pixel pitch from the first image pickup element; and a second optical unit in front of the second image pickup element in the second camera body, the second optical unit including a plurality of optical elements such as a second optical low-pass filter different in thickness from the first optical low-pass filter, wherein refractive indices and thicknesses in the plurality of optical elements of the first and second optical units are determined so that the first optical unit is approximately equal in effective optical path length to the second optical unit.

Another digital camera system of the present invention includes: an interchangeable lens; a first camera body allowing the interchangeable lens to be attached thereto, the first camera body including a first image pickup element; a first optical unit arranged in front of the first image pickup element in the first camera body, the first optical unit including a plurality of optical elements; a second camera body allowing the interchangeable lens to be attached thereto, the second camera body including a second image pickup element different in pixel pitch from the first image pickup element; and a second optical unit arranged in front of the second image pickup element in the second camera body, the second optical unit including a plurality of optical elements, wherein an effective optical path length of the first optical unit, represented by an equation $\Sigma t i \times (1-ni)/ni$, is approximately equal to an effective optical path length of the second optical unit, represented by an equation $\Sigma tj \times (1-nj)/nj$, where ni represents a refractive index of each optical element in the first optical unit, ti represents a thickness of each optical element in the first optical unit, nj represents a refractive index of each optical element in the second optical unit, tj represents a thickness of each optical element in the second optical unit, and i and j are respectively sequential integer numbers, starting with 1, and assigned to the respective optical elements.

These and other features and advantages will be apparent to those skilled in the art after considering the following description in connection with the accompanying drawings.

BRIEF DESCRIPTION OF THE DRAWINGS

FIG. 11 illustrates a relationship between an incident angle X0 with respect to the optical element and a ratio of ray deviation ΔHj/ΔHi;

FIG. 13 is a perspective view of an image pickup unit of the digital camera of FIGS. 9A and 9B, with a portion thereof being cut away to reveal the internal structure thereof;

FIG. 18 is a graph plotting a relationship between a pixel pitch of the image pickup element, i.e., the number of pixels in the image pickup element and a thickness of the optical LPF.

DETAIL DESCRIPTION OF THE PREFERRED EMBODIMENTS

Embodiments of the present invention will be described below with reference to drawings.

Figure 17:
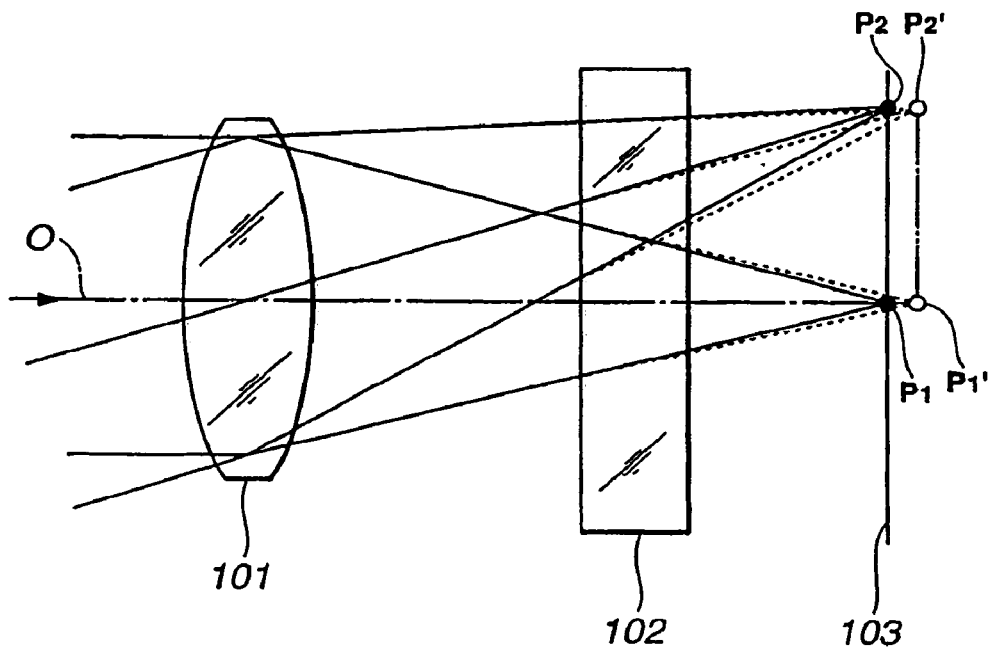
FIG. 17 illustrates an optical path illustrating the change of the image-forming position of the photographic optical system in response to the presence or absence of an optical filter in front of the image pickup element.

Prior to the description of the embodiments of the invention, optical influences of the thickness of an optical LPF in front of the surface of an image pickup element will be described. For example, when optical LPFs having different thicknesses are provided in front of the surface of an image pickup element, the image-forming position changes. FIG. 17 is an optical path diagram showing a state where an image-forming position changes based on the presence or absence of an optical LPF in front of the surface of an image pickup element.

When an optical LPF 102 is not provided in front of an image pickup surface 103 of an image pickup element as shown in FIG. 17, the center luminous flux having passed through a lens 101 forms an image at a point P1 on the image pickup surface 103.

A peripheral luminous flux having passed through the lens 101 forms an image at a point P2 on the image pickup surface 103. However, when the optical LPF 102 is provided in front of the image pickup surface 103 of the image pickup element, the center luminous flux having passed through the lens 101 forms an image at a point P1' behind the image pickup surface 103. The peripheral luminous flux having passed through the lens 101 form an image at a point P2' behind the image pickup surface 103. When the optical LPF 102 is thicker, the luminous flux forms an image in a more rear direction. In other words, the effective optical path length of a luminous flux to the image-forming position depends on the thickness of the optical LPF.

On the other hand, the optical length generally differs between a luminous flux incident on the center of the photographic screen and a luminous flux incident on the edge portion of the photographic screen in a photographic optical system of a digital camera, generating a field curvature aberration as a result. The difference in optical path length of the center and edge portion of the photographic screen can be corrected by providing the photographic optical system with an optical characteristic for canceling the curvature of the field to correct the curvature of the field as a result.

However, when the principle of the aberration correction is applied to a lens-interchangeable, single-lens reflex digital camera, problems as follows may occur. That is to say, in a single-lens reflex digital camera system including a first camera body having a first optical LPF and an interchangeable lens designed for the first camera body, when the interchangeable lens is attached to a second camera body having a second optical LPF, and when the thicknesses of the first and second optical LPFs differ, a problem that the curvature-of-the-field aberration cannot be corrected properly occurs. This problem occurs when the first and second camera bodies include image pickup elements having different pixel pitches, the thicknesses of the optical LPFs are set so as to be compliant with the pixel pitches, respectively, as described above.

Figure 1A:
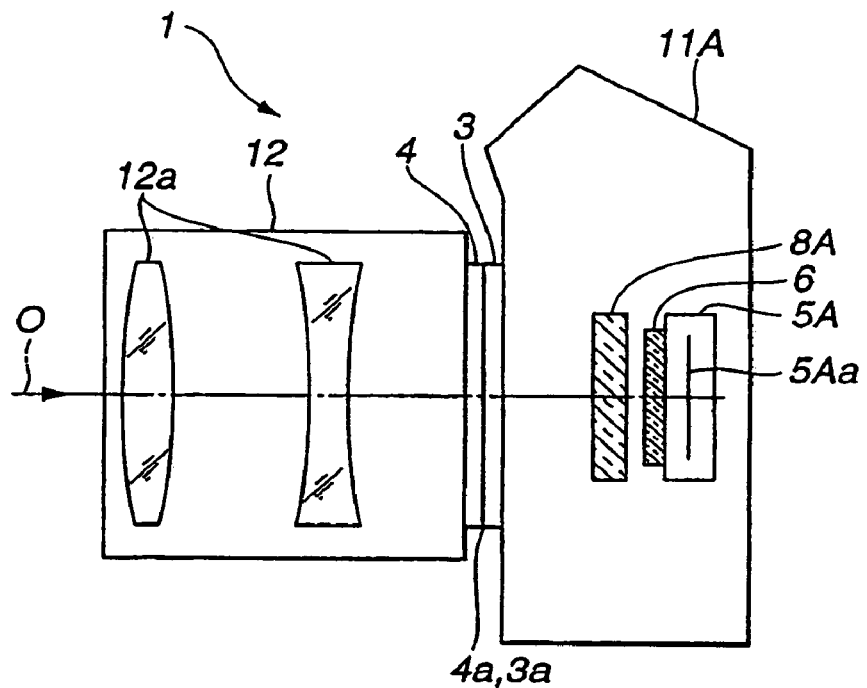
FIG. 1A shows an arrangement of a combination of a camera body and interchangeable lens, an optical member and an image pickup element in a digital camera system according to a first embodiment of the invention and shows a combination of a reference camera body and an interchangeable lens.
Figure 1B:
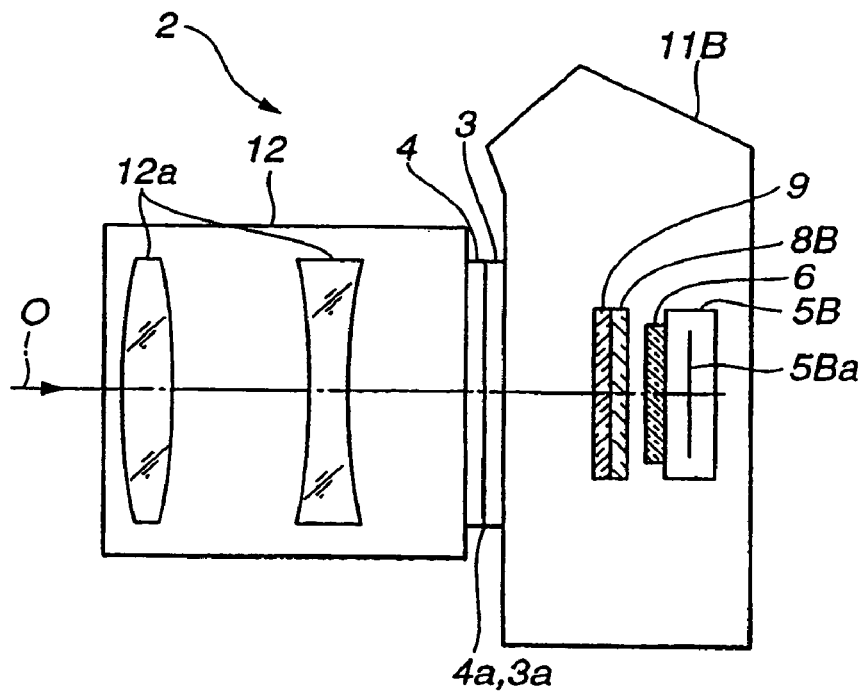
FIG. 1B shows an arrangement of a combination of a camera body and interchangeable lens, an optical member and an image pickup element in the digital camera system in FIG. 1A and shows a combination of a non-reference camera body and an interchangeable lens.

Next, prior to the detail description of the digital camera system according to the first embodiment of the invention, the outline will be described with reference to FIGS. 1A and 1B. FIGS. 1A and 1B are diagrams each showing an arrangement of a combination of a camera body and interchangeable lens, a filter optical member and an image pickup element in a digital camera system according to a first embodiment of the invention. FIG. 1A shows a combination of a reference camera body and an interchangeable lens. FIG. 1B shows a combination of a non-reference camera body and an interchangeable lens.

A digital camera system according to this embodiment has a digital camera 1 and a digital camera 2 shown in FIGS. 1A and 1B.

The digital camera 1 includes a first camera body 11A and an interchangeable lens barrel 12. The first camera body 11A is a reference camera body. The interchangeable lens barrel 12 is a removable interchangeable lens.

The digital camera 2 includes a second camera body 11B and the interchangeable lens barrel 12. The second camera body 11B is a non-reference camera body. The interchangeable lens barrel 12 serves as a removable interchangeable lens having the same specification as the one attached to the first camera body 11A.

The first camera body 11A contains an image pickup element 5A and an optical LPF 8A and has a camera side mount portion 3. The image pickup element 5A is a first image pickup element constituted of a CCD (or a CMOS type image pickup element) and the like having a protection glass 6. The optical LPF 8A is a first optical low-pass filter, which is an optical element arranged in front of the surface of the image pickup element. The camera side mount portion 3 has a camera-side mount surface 3a abuttable to a lens side mount surface 4a. In other words, when both of them are fixed by engaging the lens side mount portion 4 and the camera side mount portion 3, the position in an optical axis direction is fixed when the lens side mount surface 4a and the camera side mount surface 3a abut each other.

For example, the image pickup element 5A is a 4/3 type image pickup element and has a predetermined reference pixel pitch δ0 (corresponding to a reference number of pixels S0) (see FIG. 18). The predetermined reference pixel pitch δ0 is a first pixel pitch. A subject image formed on an optoelectronic converting surface 5Aa, which is an image-forming surface of the image pickup element, is converted to electric image pickup signals.

In order to prevent the occurrence of moiré, the optical LPF 8A contains crystal having a double refraction characteristic in thickness corresponding to the reference pixel pitch δ0 of the image pickup element 5A and includes an infrared absorbing glass. Furthermore, the optical LPF 8A has a predetermined refractive index, which is substantially the same as that of glass.

The optical LPF 8A is arranged between the camera side mount portion 3 and the image pickup element 5A and the thickness of the optical LPF 8A is thickest among that of the optical LPF 8A, that of an optical LPF 8B of the second camera body, which will be described later, and that of an optical LPF applied in another non-reference camera body to which the same interchangeable lens barrel 12 can be removably attached.

The interchangeable lens barrel 12 has a lens side mount portion 4 including a lens side mount surface 4a abuttable to a first camera body side or a second camera body side mount surface 3a. The interchangeable lens barrel 12 contains a photographic optical system 12a including multiple photographic lenses. The interchangeable lens barrel 12 has an identical specification and can be removably attached to both of the first camera body 11A and the second camera body 11B. For example, the interchangeable lens barrel 12 may be one of multiple interchangeable lenses such as an interchangeable lens having different focal distances, a zoom lens and a macro lens.

When the interchangeable lens barrel 12 is attached to the reference camera body 11A, a subject luminous flux from the photographic optical system 12a pass through the optical LPF 8A and form an image on the image pickup surface 5Aa of the image pickup element 5A. In this case, the photographic optical system 12a is designed and produced so as to form an image on the image pickup surface 5Aa without the curvature-of-the-field aberration, with the optical path length being changed (effective change in optical path length) in accordance with the refractive index and thickness of the optical LPF 8A. In other words, neither the image-formed point P1' by the center luminous flux nor the image-formed point P2' by a peripheral luminous flux shown in FIG. 17 have the curvature-of-the-field aberration on the image pickup surface 5Aa of the image pickup element 5A.

The second camera body 11B contains an image pickup element 5B, an optical LPF 8B and a compensating optical element 9, and has the camera side mount portion 3. The image pickup element 5B is a second image pickup element constituted of a CCD (MOS type image pickup element) having a protection glass 6 and the like. The optical LPF 8B is a second optical low-pass filter arranged in front of the surface of the image pickup element. The compensating optical element 9 is a compensating optical system. The camera side mount portion 3 is common to the first camera body 11A and has a camera side mount surface 3a, which can be engaged with the lens side mount surface 4a.

The image pickup element 5B is a 4/3 type image pickup element similar to the reference image pickup element 5A but has a pixel pitch δ1, which is a second pixel pitch and is different from the reference pixel pitch δ0. A subject image formed on a photoelectric conversion surface 5Ba is converted to electric image pickup signals as well. The photoelectric conversion surface 5Ba is an image-forming surface of the image pickup element 5B.

The optical LPF 8B is thinner than the optical LPF 8A and contains crystal or an LN element having a double refraction characteristic and having a thickness corresponding to the pixel pitch δ1 of the image pickup element 5B and further contains infrared absorbing glass. The optical LPF 8B has substantially the same predetermined refractive index as glass. The optical LPF 8B is also disposed between the lens mount portion 3 and the image pickup element 5B.

The compensating optical element 9 is an optical member constituted of glass and the like, which does not have a double refractive characteristic but has substantially the same refractive index as the optical LPF 8A. The compensating optical element 9 is attached and built in the second optical LPF 8B so that the image-forming position of a subject luminous flux by the interchangeable lens barrel 12 is not displaced from the photoelectric conversion surface 5Ba of the image pickup element 5B. Furthermore, the aberration including the curvature-of-the-field aberration does not occur. In other words, the compensating optical element 9 compensates changes in optical path length due to the optical LPF 8B which is thinner in the first camera body 11A. The compensating optical element 9 is set such that the sum of the thickness of the compensating optical element 9 and optical LPF 8B is substantially the same as the thickness of the optical LPF 8A.

In the digital camera system according to this embodiment having the above-described construction, the interchangeable lens barrel 12 can be attached to the reference first camera body 11A. The first camera body 11A contains the image pickup element 5A having the predetermined reference pixel pitch δ0. A subject luminous flux from an interchangeable lens are double-refracted by the optical LPF 8A and form an image properly on the image converting surface 5Aa of the image pickup element 5A without a curvature-of-the-field aberration.

The interchangeable lens barrel 12 can be attached to the non-reference second camera body 11B. The second camera body 11B contains the image pickup element 5B having a pixel pitch δ1. A subject luminous flux from an interchangeable lens passes through the compensating optical element 9, is double refracted by the optical LPF 8B, and forms an image on the image pickup conversion surface 5Ba of the image pickup element 5B. The amount of the change in effective optical path length due to the thin optical LPF 8B is compensated by inserting the compensating optical element 9. The subject luminous flux forms an image properly without the curvature-of-the-field aberration similarly on the image pickup conversion surface 5Ba of the image pickup element 5B.

Next, internal constructions of the digital cameras 1 and 2 in the digital camera system according to this embodiment will be described with reference to FIGS. 2 and 3.

Figure 2:
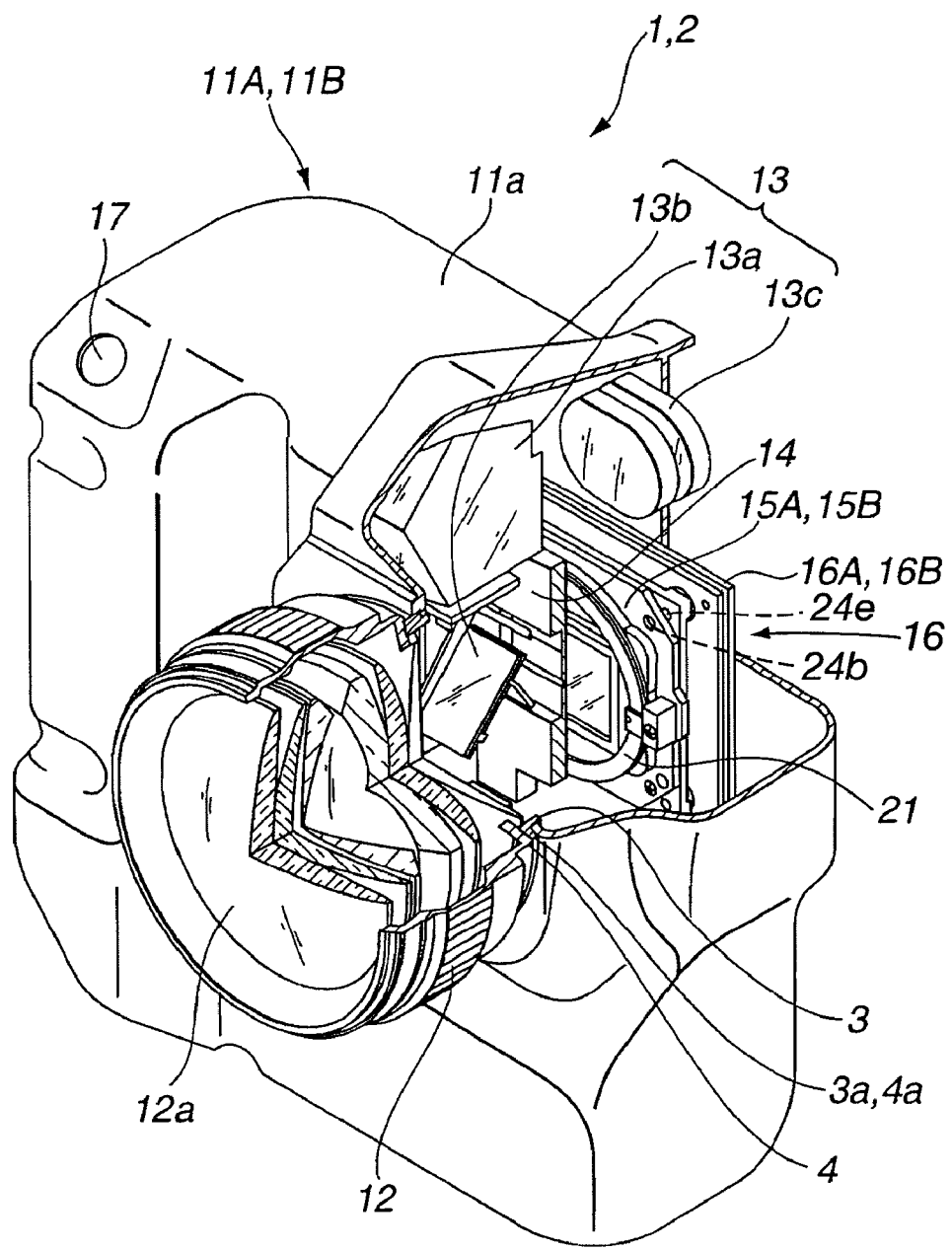
FIG. 2 is a perspective diagram (including a partial cut-out) showing an internal construction of a camera body having an interchangeable lens barrel in the digital camera according to this embodiment shown in FIGS. 1A and 1B.
Figure 3:
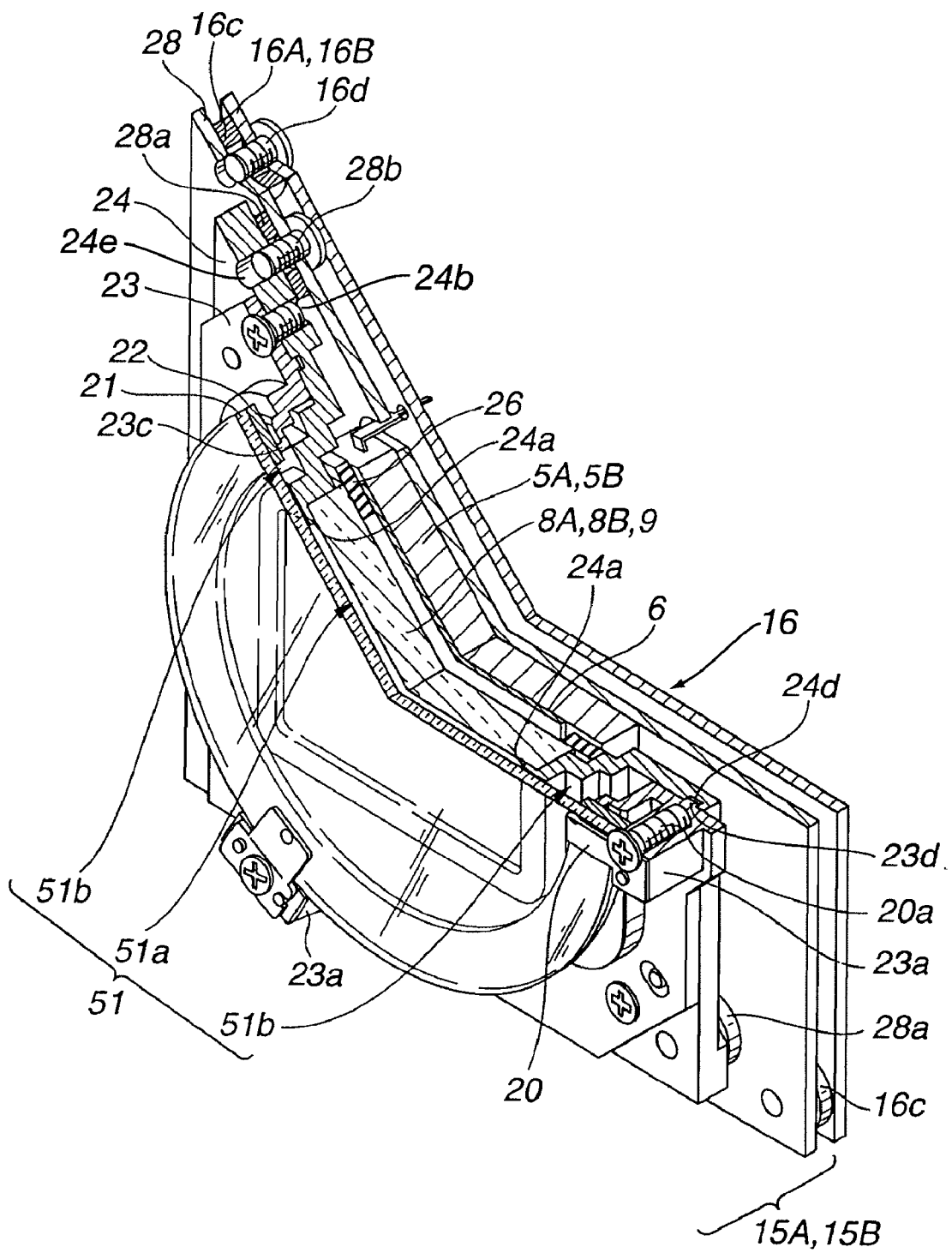
FIG. 3 is a perspective diagram (including a partial cut-out) showing an internal construction relating to an image pickup unit of the digital camera according to this embodiment shown in FIGS. 1A and 1B.

FIG. 2 is a perspective diagram (including a partial cut-out) showing an internal construction of the digital camera in which an interchangeable lens barrel is attached to the camera body. FIG. 3 is a perspective diagram (including a partial cut-out surface) showing an internal construction relating to an image pickup unit of the digital camera.

Each of the digital cameras 1 and 2 has an interchangeable lens barrel 12 having a common specification, and a first camera body 11A or a second camera body 11B. The first camera body 11A is a reference camera body to which the interchangeable lens barrel 12 can be removably attached. The second camera body 11B is a non-reference camera body. The mount surface 4a of the interchangeable lens side mount portion 4 and the mount surface 3a of the camera body side mount portion 3 are abutted to each other such that the interchangeable lens barrel 12 is mounted.

The first camera body 11A and the second camera body 11B have a common construction except for the image pickup element of the image pickup unit and the optical LPF, which are to be contained.

The interchangeable lens barrel 12 holds the photographic optical system 12a inside. The photographic optical system 12a includes multiple lenses and a driving mechanism for the multiple lenses. The photographic optical system 12a comprises multiple optical lenses, for example, such that a luminous flux from a subject can pass through the multiple optical lenses and forms an image on a predetermined position (on the photoelectric conversion surface of the image pickup element 5A or 5B in FIG. 3) without different kinds of optical aberration such as the curvature-of-the-field aberration. In other words, the photographic optical system 12a is designed to eliminate the curvature-of-the-field aberration in an optical LPF in front of the surface of an image pickup element.

The "state without aberration" includes a state of a certain level of aberration or below, which does not influence practical uses. In other words, the photographic optical system 12a is designed such that various kinds of aberration can be optimized in consideration of, for example, an optical LPF in front of the surface of the image pickup element.

Each of the camera bodies 11A and 11B is a so-called "single-lens reflex type" camera body and includes various components within a body portion 11a. Each of the camera bodies 11A and 11B further includes a body side mount portion 3 on the front surface such that the lens barrel 12 holding the photographic optical system 12a can be removably attached thereto. In other words, the camera body portion 11a has an exposure opening substantially at the center on the front side of the camera body portion 11a. The exposure opening has a predetermined bore for guiding subject luminous fluxes into the camera body portion 11a.

Detail internal constructions of the camera bodies 11A and 11B of the first and second digital cameras will be described below. First of all, various operation members, such as a release button 17, for operating the camera body portion 11a is provided at a predetermined position on the top surface or back surface of the camera body portion 11a. The release button 17 is used for generating instruction signals to start a photographic operation.

The camera body portion 11a includes and arranges various components at predetermined positions, as shown in FIG. 2, comprising a finder device 13, a shutter portion 14, an image pickup unit 15A (for the first camera body) or 15B (for the second camera body), multiple circuit substrates including main circuit substrate 16A (for the first camera body) or 16B (for the second camera body) and the like. The finder device 13 is provided for forming a desired subject image by the photographic optical system 12a, for example, on a predetermined position different from the photoelectric conversion surface of the image pickup elements 5A and 5B. The finder device 13 constitutes a so-called "observation optical system". The shutter potion 14 includes a shutter mechanism, for controlling the time for irradiating a subject luminous flux to the photoelectric conversion surface of the image pickup element 5A or 5B. The image pickup unit 15A or 15B includes an image pickup element for obtaining subject image signals based on the subject luminous flux having passed through the photographic optical system 12a. Various electric members of electric circuits are implemented on the main circuit substrate 16A or 16B. The electric circuits includes an image signal processing circuit for performing various kinds of signal processing on image signals obtained by the image pickup element 5A or 5B.

A dust-preventive filter 21 is provided in front of the surface of each of the image pickup units 15A and 15B. The dust-preventive filter 21 prevents the deposition of dust to the photoelectric conversion surface of an image pickup element.

The finder device 13 includes a reflector 13b, a pentaprism 13a and an eyepiece 13c. The reflector 13b is arranged to bend an optical axis of a subject luminous flux having passed through the photographic optical system 12a and to guide the subject luminous flux to the observation optical system side. The pentaprism 13a receives a luminous flux emitted from the reflector 13b and forms an erect image thereof. The eyepiece 13c is used for enlarging and observing a subject image.

The reflector 13b is freely movably arranged between a position evacuated from the optical axis of the photographic optical system 12a and a predetermined position on the optical axis. The reflector 13b is normally disposed at a predetermined angle, such as 45°, on the optical axis of the photographic optical system 12a with respect to the optical axis. Thus, when the camera 1 is at the normal state, a subject luminous flux having passed through the photographic optical system 12a are bent by the reflector 13b and are refracted toward the pentaprism 13a above the reflector 13b.

On the other hand, while the camera 1 is performing a photographic operation and during the real exposure operation, the reflector 13b can move to a predetermined position where the reflector 13b evacuates from the optical path of the photographic optical system 12a. Thus, the subject luminous flux is guided to the image pickup element side and illuminates the photoelectric conversion surface.

The shutter portion 14 is similar to those generally used in a conventional camera or the like, such as a focal plane type shutter mechanism and a driving circuit for controlling operations of the shutter mechanism.

The image pickup units 15A and 15B for the first and second camera bodies, respectively, have substantially the same construction except for the contained image pickup elements and optical LPFs. First of all, the image pickup unit 15A for the first camera body will be described.

The image pickup unit 15A includes the image pickup element 5A, an image pickup element fixing plate 28, the optical LPF 8A, a low-pass filter receiving member 26, an image pickup element storage case member 24 (called CCD case 24 hereinafter), a dust-preventive filter receiving member 23, a dust-preventive filter 21, a piezoelectric element 22 and a press member 20. The image pickup element 5A is constituted of a CCD and the like for obtaining image signals corresponding to the light irradiated onto the photoelectric conversion surface of the image pickup element 5A through the photographic optical system 12a. The image pickup element fixing plate 28 is constituted of a thin-plate like member for fixing and supporting the image pickup element 5A. The optical LPF 8A is an optical element in front of the photoelectric conversion surface of the image pickup element 5A, for removing high frequency components from a subject luminous flux irradiated through the photographic optical system 12a. The low-pass filter receiving member 26 is constituted of an elastic member substantially in a frame shape and is provided on the edge portion between the optical LPF 8A and the image pickup element 5A. The CCD case 24 stores, fixes and holds the image pickup element 5A and supports the optical LPF 8A by closely abutting to the edge portion and the vicinity. A predetermined position of the CCD case 24 is closely in contact with the dust-preventive filter receiving member 23. The dust-preventive filter receiving member 23 is provided in front of the surface side of the CCD case 24 and is closely in contact with the edge portion or the vicinity. The dust-preventive filter 21 is a dust-preventive member supported by the dust-preventive filter receiving member 23 and faces toward the optical LPF 8A at a position spaced apart from the optical LPF 8A by a predetermined distance in front of the surface side of the optical LPF 8A in front of the photoelectric conversion surface side of the image pickup element 5A. The piezoelectric element 22 is provided on the edge portion of the dust-preventive filter 21 and removes dust by giving a predetermined amount of vibration to the dust-preventive filter 21. The press member 20 is constituted of an elastic body for connecting, fixing and holding the dust-preventive filter 21 to the dust-preventive filter receiving member 23 in an air-tight manner.

The image pickup element 5A performs photoelectric conversion processing on subject luminous fluxes received by the photoelectric conversion surface 5Aa (FIG. 1A) of the image pickup element 5A through the photographic optical system 12a. Thus, the image pickup element 5A can obtain image signals corresponding to the subject image on the photoelectric conversion surface. The image pickup element 5A may be a 4/3 type charge-coupled device. In this case, the reference pixel pitch $\delta 0$, which is a first pixel pitch, is substantially 7 µm, for example.

The image pickup element 5A is implemented at a predetermined position on the main circuit substrate 16A through the image pickup element fixing plate 28. An image signal processing circuit and work memory, not shown, are implemented together on the main circuit substrate 16. Thus, output signals from the image pickup element 5A, that is, image signals obtained through photoelectric conversion processing are transmitted to the image signal processing circuit.

The protection glass 6 (FIG. 3) is attached in front of the photoelectric conversion surface of the image pickup element 5A.

The signal processing performed in the image signal processing circuit includes various kinds of signal processing such as processing for converting image signals obtained from the image pickup element 5A to signals suitable for recording. In this case, the image signals correspond to the image formed on the photoelectric conversion surface of the image pickup element 5A by the photographic optical system 12a held within the lens barrel 12 attached to the body side mount portion 3. These kinds of signal processing are the same as processing normally performed in a general digital camera for handling electronic image signals.

The optical LPF 8A is provided in front of the surface side of the image pickup element 5A via the low-pass filter receiving member 26. The optical LPF 8A contains crystal, which is an optical element having a double refraction characteristic. As described later, the optical LPF 8A has a thickness t1 corresponding to a pixel pitch (about 7 µm) of the image pickup element 5A. The optical LPF 8A further contains an infrared absorbing glass, as described later.

The CCD case 24 is arranged in such a way to cover the optical LPF 8A. The CCD case 24 has a rectangular opening substantially at the center. The optical LPF 8A and image pickup element 5A are provided in the opening from the back. A step 24a having a substantially L-shaped section is provided on the internal edge portion on the back side of the opening.

As described above, the low-pass filter receiving member 26 constituted of an elastic member is provided between the optical LPF 8A and the image pickup element 5A. The low-pass filter receiving member 26 is provided at a position avoiding an effective range of the photoelectric conversion surface on the edge portion of the front side of the image pickup element 5A. Furthermore, the low-pass filter receiving member 26 is abutted to the vicinity of the edge portion of the back side of the optical LPF 8A. The optical LPF BA and the image pickup element 5A are in contact with each other substantially in an air-tight manner. Thus, elastic force toward the optical axis by the low-pass filter receiving member 26 acts on the optical LPF 8A.

Then, the edge portion of the front side of the optical LPF 8A is disposed so as to be in contact with the step 24a of the CCD case 24 substantially in an air-tight manner. Thus, the position in the optical axis direction of the optical LPF 8A is controlled against the elastic force by the low-pass filter receiving member 26 for attempting to move the optical LPF 8A toward the optical axis.

In other words, the optical LPF 8A laid within the opening of the CCD case 24 from the back side is positionally controlled by the step 24a in the optical axis direction. Thus, the optical LPF 8A is prevented from coming out from the inside of the CCD case 24 toward the front side.

In this way, after the optical LPF 8A is inserted from the back side into the opening of the CCD case 24, the image pickup element 5A is disposed on the back side of the optical LPF 8A. In this case, the low-pass filter receiving member 26 is held at the edge portion between the optical LPF 8A and the image pickup element 5A.

As described above, the image pickup element 5A is implemented on the main circuit substrate 16 via the image pickup element fixing plate 28. The image pickup element fixing plate 28 is fixed via a spacer 28a with a screw 28b into a screw hole 24e from the back side of the CCD case 24. The main circuit substrate 16 is fixed to the image pickup element fixing plate 28 with a screw 16d via a spacer 16c.

Figure 5:
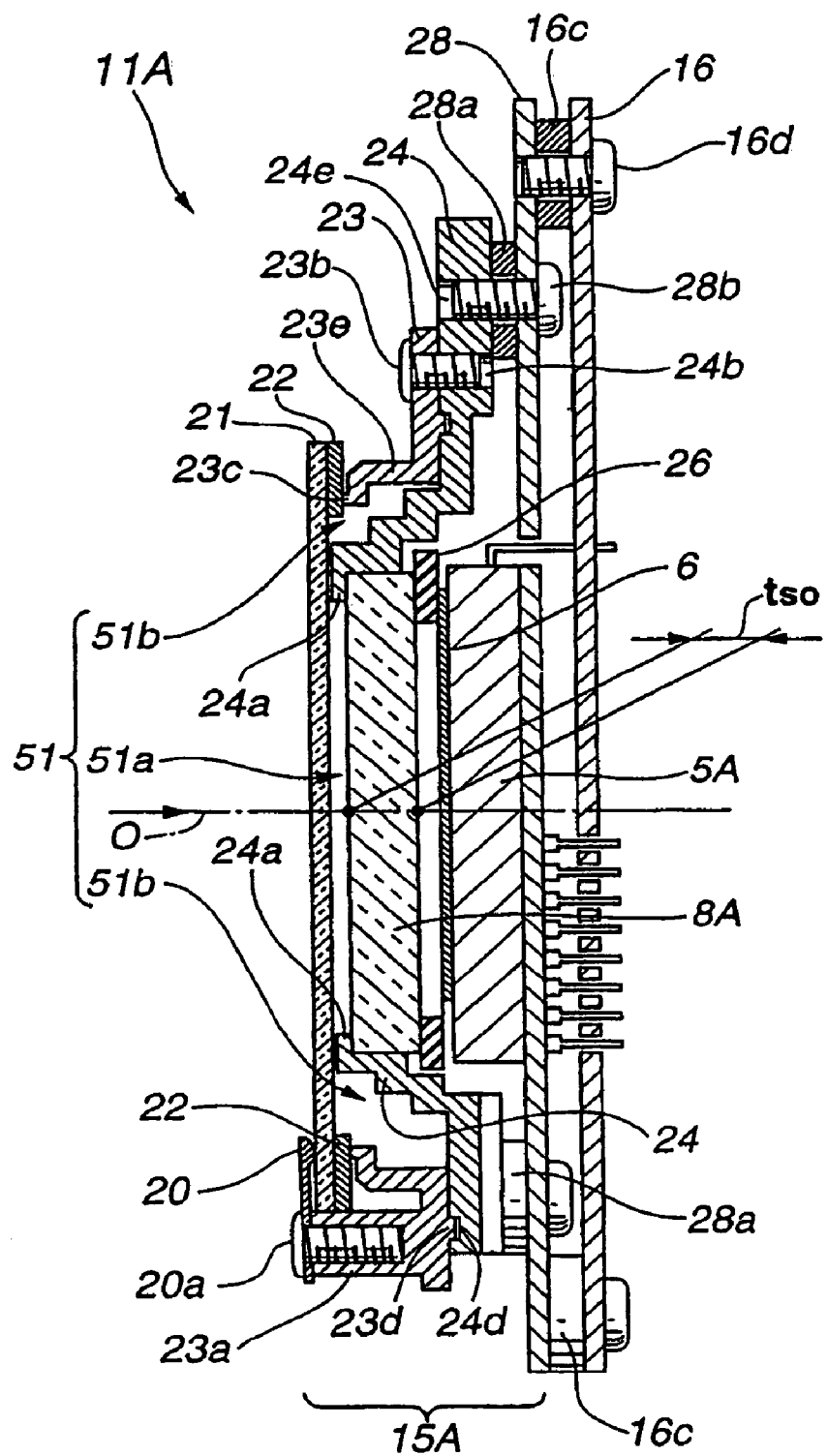
FIG. 5 is an enlarged vertical sectional diagram of the image pickup unit to be applied to the first camera body of the digital camera in FIGS. 1A and 1B.

The dust-preventive filter receiving member 23 is fixed to the screw hole 24b of the CCD case 24 on the front side of the CCD case 24 with a screw 23b, shown best in FIG. 5. A circular groove 24d in a substantially ring shape is provided at a predetermined position on the front side on the edge side of the CCD case 24. On the other hand, a ring-shape projection 23d to fit to the circular groove 24d of the CCD case 24 is provided in a substantially-ring form at a predetermined position on the back side of the edge side of the dust-preventive filter receiving member 23. Therefore, when the ring-shape projection 23d fits into the circular groove 24d, the CCD case 24 and the dust-preventive filter receiving member 23 fit into each other substantially in an air-tight manner in a ring-shaped area, that is, in an area having the circular groove 24d and the ring-shaped projection 23d.

The dust-preventive filter 21 contains glass and has a circular or polygonal plate as a whole. An area extending, with some extent, at least from the center of the dust-preventive filter 21 to the edge is transparent. The transparent area faces toward the front side of the optical LPF 8A through a predetermined space.

The piezoelectric element 22 is bonded on the edge portion of one surface of the dust-preventive filter 21 with adhesive means, for example, such that the piezoelectric element 22 is integrated to the edge portion. The piezoelectric element 22 is a predetermined vibrating member for giving vibrations to the dust-preventive filter 21 and includes an electromechanical conversion element and the like. The piezoelectric element 22 can cause a predetermined amount of vibration in the dust-preventive filter 21 by externally applying a predetermined amount of driving voltage.

The dust-preventive filter 21 is fixed and is held by the press member 20 such that the dust-preventive filter 21 can be engaged with the dust-preventive filter receiving member 23 in an air-tight manner. The press member 20 is constituted of an elastic body such as a flat spring.

The dust-preventive filter receiving member 23 has a circular or polygonal opening in the vicinity of the substantially center of the dust-preventive filter receiving member 23. The opening is designed to be large enough for subject luminous fluxes through the photographic optical system 12a to illuminate the photoelectric conversion surface of the image pickup element 5A at the back.

A wall 23e in a substantially ring shape extends forward from the edge portion of the opening. A receiver 23c extends toward the front surface from the distal end of the wall 23e.

On the other hand, multiple (three, in this embodiment) projecting portions 23a extend forward from predetermined positions on the external edge portion of the front side of the dust-preventive filter receiving member 23. Each of the projecting portions 23a can fix the press member 20 for fixing and holding the dust-preventive filter 21. The press member 20 is fixed to the end of the projecting portion 23a with fastening means such as a screw 20a.

The press member 20 includes an elastic body such as a flat spring, as described above. The proximal end of the press member 20 is fixed to the projecting portion 23a, and the free end is abutted to the external edge portion of the dust-preventive filter 21. Thus, the dust-preventive filter 21 is pressed toward the dust-preventive filter receiving member 23 side, that is, toward the optical axis.

In this case, a predetermined position of the piezoelectric element 22 on the external edge portion of the back side of the dust-preventive filter 21 is abutted to the receiver 23c. Thus, the positions of the dust-preventive filter 21 and piezoelectric element 22 in the optical axis direction can be controlled. Then, the dust-preventive filter 21 is fixed and is held so as to engage the dust-preventive filter receiving member 23 in an air tight manner via the piezoelectric element 22.

In other words, the dust-preventive filter receiving member 23 is forced by the press member 20 to engage the dust-preventive filter 21 through the piezoelectric element 22 in an air-tight manner.

By the way, as described above, the circular groove 24d and ring-shaped projection 23d of the dust-preventive filter receiving member 23 and the CCD case 24 fit into each other substantially in an air-tight manner. At the same time, the dust-preventive filter receiving member 23 and the dust-preventive filter 21 are forced by the press member 20 to engage each other in an air-tight manner via the piezoelectric element 22. The optical LPF 8A in the CCD case 24 is arranged substantially in an air-tight manner between the edge portion of the front side of the optical LPF 8A and the step 24a of the CCD case 24. Furthermore, the image pickup element 5A is provided on the back side of the optical LPF 8A via the low pass filter receiving member 26. The substantial air-tightness is also held between the optical LPF 8A and the image pickup element 5A.

Therefore, a predetermined gap 51a is provided in a space between the optical LPF BA and the dust-preventive filter 21. The edge side of the optical LPF 8A, that is, the CCD case 24, the dust-preventive filter receiving member 23 and the dust-preventive filter 21 form a space 51b. The space 51b is a sealed space extending toward the outside of the optical LPF 8A.

The space 51b is set to be larger than the gap 51a. A sealed space 51 includes the gap 51a and the space 51b. The space 51 is formed by the CCD case 24, the dust-preventive filter receiving member 23, the dust-preventive filter 21 and the optical LPF 8A substantially in an air-tight manner, as described above.

Figure 4:
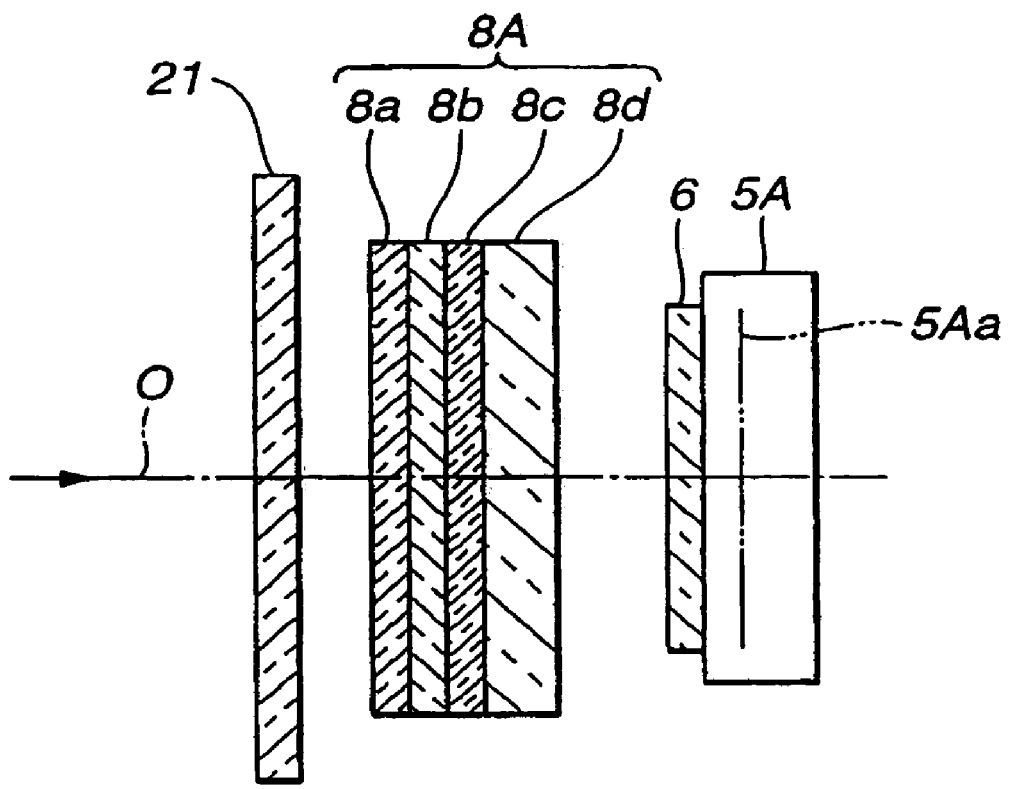
FIG. 4 is a schematic diagram showing details of an optical system of an image pickup unit to be applied to a first camera body of the digital camera in FIGS. 1A and 1B.

FIG. 4 is a schematic diagram showing details of an optical system of the image pickup unit 15A in the first camera body 11A. FIG. 5 is an enlarged vertical sectional diagram of the image pickup unit 15A.

As shown in FIG. 4, the protection glass 6 is provided in front of the surface of the image pickup element 5A. Furthermore, the optical LPF 8A and the dust-preventive filter 21 are disposed in front of the image pickup element 5A.

In the optical LPF 8A, a crystal plate 8a on the front side, an infrared absorbing glass 8b, a crystal plate 8c and a crystal plate 8d are superimposed. The double refraction direction of the crystal plate 8a is −45°. The double refraction direction of the crystal plate 8c is +45°. The double refraction direction of the crystal plate 8d is 0°.

Each of the crystal plates 8a and 8c has a thickness corresponding to the pixel pitch (about 7 µm) of the image pickup element 5A shown in FIG. 18. On the other hand, the crystal plate 8d has a thickness of the square root of the thickness of the crystal plates 8a and 8b. The optical LPF 8A having the above-described construction can prevent moiré occurring when a subject luminous flux via the interchangeable lens barrel 12 forms an image on the photoelectric conversion surface 5Aa of the image pickup element 5A.

The crystal plates 8a, 8c, and 8d and the infrared absorbing glass 8b have refractive indices close to that of glass and have a thickness ts0. The photoelectric conversion surface 5Aa of the image pickup element 5A is positioned at the image forming position of a subject luminous flux based on the effective light path length in accordance with the refractive index and the thickness ts0. Therefore, a subject luminous flux captured by the lens barrel 12 can form an image properly on the photoelectric conversion surface 5Aa of the image pickup element 5A without the curvature-of-the-field aberration. More strictly speaking, the thickness of the protection glass 6 and dust-preventive filter 21 also contributes to the change in effective optical path length. However, the protective glass 6 and the dust-preventive filter 21 have the same thickness in the first camera body and the second camera body. Therefore, the effective optical path length in accordance with the protective glass 6 and dust-preventive filter 21 do not differ between the first camera body and the second camera body.

On the other hand, when the protection glass 6 and the dust-preventive filter 21 have different thicknesses and/or materials between the first camera body and the second camera body, the curvature-of-the-field aberration is corrected by changing the thickness or the material of the compensating optical element in accordance with the change in the effective optical path length based on the differences.

As shown in FIG. 18, as the pixel pitch P decreases, the thickness of the corresponding optical LPF decreases. The thickness of the LN element in accordance with the same pixel pitch P is about ⅕ to ⅙ of that of the crystal plate.

Figure 6:
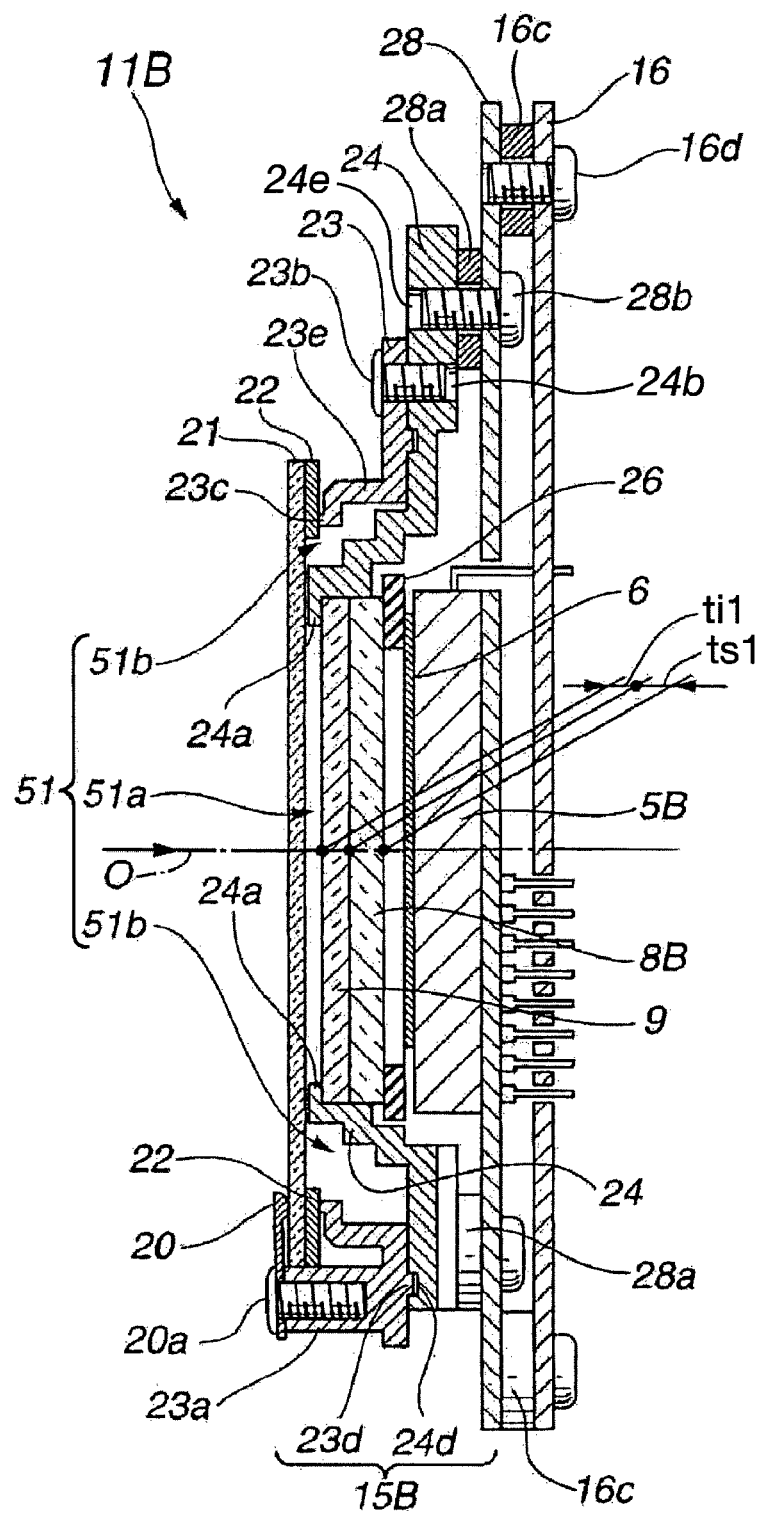
FIG. 6 is an enlarged vertical sectional diagram of an image pickup unit to be applied to a second camera body of the digital camera in FIGS. 1A and 1B.

On the other hand, the second camera body 11B has the image pickup element 5B of the image pickup unit 15B, the optical LPF 8B and the compensating optical element 9, which is a compensating optical system, instead of the image pickup element 5A and the optical LPF 8A in the first camera body 11A, as described above. The rest of the construction is the same. FIG. 6 is an enlarged vertical sectional diagram of the image pickup unit 15B in the second camera body 11B.

The size of the image pickup element 5B is 4/3 type, which is the same as that of the image pickup element 5A, and has a pixel pitch δ1, which is a second pixel pitch different from the reference pixel pitch δ0 (about 7 μm). The photoelectric conversion surface 5Ba (FIG. 1B) of the image pickup element 5B is spaced from the mount surface 3a by the same relative distance between the mount surface 3a and the photoelectric conversion surface 5Aa (FIG. 1A) of the image pickup element 5A.

The optical LPF 8B has a thickness ts1 for a double-refracting subject luminous flux in accordance with the pixel pitch δ1 of the image pickup element 5B (FIG. 6). The optical LPF 8B may be crystal or an LN element.

The compensating optical element 9 has a thickness ti1 for compensating an amount of change in effective optical path length due to the change of the optical LPF 5B into the thickness ts1 thinner than the thickness ts0 (FIG. 6). In other words, the compensating optical element 9 is an optical element, such as a glass plate having a refractive index substantially equal to that of crystal and not having a double refraction characteristic. The sum of the thickness ts1 of the optical LPF 8B and the thickness ti1 of the compensating optical element 9 is set equal to the thickness tS0 of the optical LPF 8A. The compensating optical element 9 is fixed to the optical LPF 8B with an optical adhesive.

Also in the image pickup unit 15B, a subject luminous flux captured through the interchangeable lens barrel 12 can form an image properly on the photoelectric conversion surface 5Ba of the image pickup element 5B without the curvature-of-the-field aberration and without the displacement of the image-forming position.

When the pixel pitch δ1 of the image pickup element 5B of the second camera body 11B is smaller than the reference image pitch δ0, which is 7 μm, that is, when the number of pixels of the image pickup element 5B is higher than the number of pixels of the image pickup element 5A, the thickness ts1 of the optical LPF 8B, which is a crystal plate, of the second camera body 11B is thinner than the thickness ts0 of the optical LPF 8A (FIG. 18). Here, the compensating optical element 9 is a glass plate having a thickness ti1 in accordance with the decreased amount of thickness for compensating the amount of change in effective optical path length due to the decrease in thickness of the optical LPF 8B. The compensating optical element 9 may be provided separately from the optical LPF 8B as shown in FIG. 6. However, for example, the same effect can be obtained by increasing the thickness of the infrared absorbing glass 8b, the protection glass 6 or the dust-preventive filter 21 by the amount of the thickness ti1.

On the other hand, when the pixel pitch δ1 of the image pickup element 5B of the second camera body 11B is larger than the reference image pitch δ0, 7 μm, that is, when the number of pixels of the image pickup element 5B is lower than the number of pixels of the image pickup element 5A, an LN element is applied as the optical LPF 8B so as not to further increase the thickness of the optical LPF. The thickness ts1 of the LN element extremely decreases as shown in FIG. 18 due to the double refraction characteristic in accordance with the increase in the pixel pitch. However, the thickness is 0.1 mm or larger and can be produced. Then, the compensating optical element 9 having the thickness ti1 equal to the amount of the decrease in thickness of the optical LPF 8B having an LN element is bonded to the optical LPF 8B (but, strictly speaking, the thickness ti1 of the compensating optical element 9 must be determined in consideration of the difference in refractive index between the LN element and the crystal). This allows a subject to form an image properly on the photoelectric conversion surface 5Ba (FIG. 1B) of the image pickup element 5B at the same position as that of the image pickup element 5A. The thickness of the optical LPF 8A of the first camera body 11A is the thickest in those of the optical LPFs in the other non-reference camera body such as the second camera body 11B.

As described above, when interchangeable lens barrels 12 are attached to the first camera body 11A and the second camera body 11B in a digital camera system according to this embodiment, the optical LPF 8A or 8B having different thickness (where the optical LPF 8B is thinner) is applied so as to double-refract a subject luminous flux in accordance with the pixel pitches. In this case, the first camera body 11A is a reference camera body containing the reference image pickup element 5A. The second camera body 11B contains the image pickup element 5B having a pixel pitch different from that of the first camera body 11A. In order to compensate the displacement of an image-forming position due to the decrease in thickness, the compensating optical element 9 is provided in the second camera body side. The provided compensating optical element 9 can allow the subject luminous flux properly to form an image on the photoelectric conversion surface of the image pickup element 5B without the curvature-of-the-field aberration.

The compensating optical element 9 of the second camera body 11B side has the amount of thickness equal to the decreased amount of thickness of the optical LPF 8B. Thus, the image pickup unit 15A of the first camera body 11A and the image pickup unit 15B of the second camera body 11B can take up the same spaces in the respective camera bodies. Therefore, the commonality of the constructions of the first and second camera bodies can be achieved easily.

The reference pixel pitch δ0 is 7 μm in this embodiment. A method for setting the reference pixel pitch will be described below.

As described above, the thickness of an optical low pass filter is determined based on the pixel pitch of an image pickup element. However, even with the same pixel pitch, the thickness of the optical low pass filter depends on the material. As shown in FIG. 18, the thickness significantly differs between the low pass filter containing crystal as a first material and the low pass filter applying an LN element as a second material. The number of pixels shown in FIG. 17 is for a 4/3 type image pickup element.

On the other hand, a thin optical low pass filter is preferably used for reducing the size of a camera. However, a much thinner optical low pass filter may be difficult to produce and may be easily destroyed, which is not preferable. As shown in FIG. 17, an optical low pass filter containing an LN element for the image pickup element having the pixel pitch δ lower than about 6 μm is difficult to produce.

Therefore, a pixel pitch larger than the pixel pitch corresponding to the lowest thickness, which can be produced with the second material, an LN element, is set as the reference pixel pitch. Then, by forming the optical low-pass filter in accordance with the reference pixel pitch by using the first material, crystal, the optical low pass filter can have the lowest thickness even for the camera bodies having different pixel pitches.

Next, a digital camera system according to a second embodiment of the invention will be described with reference to FIGS. 7 and 8.

Figure 7:
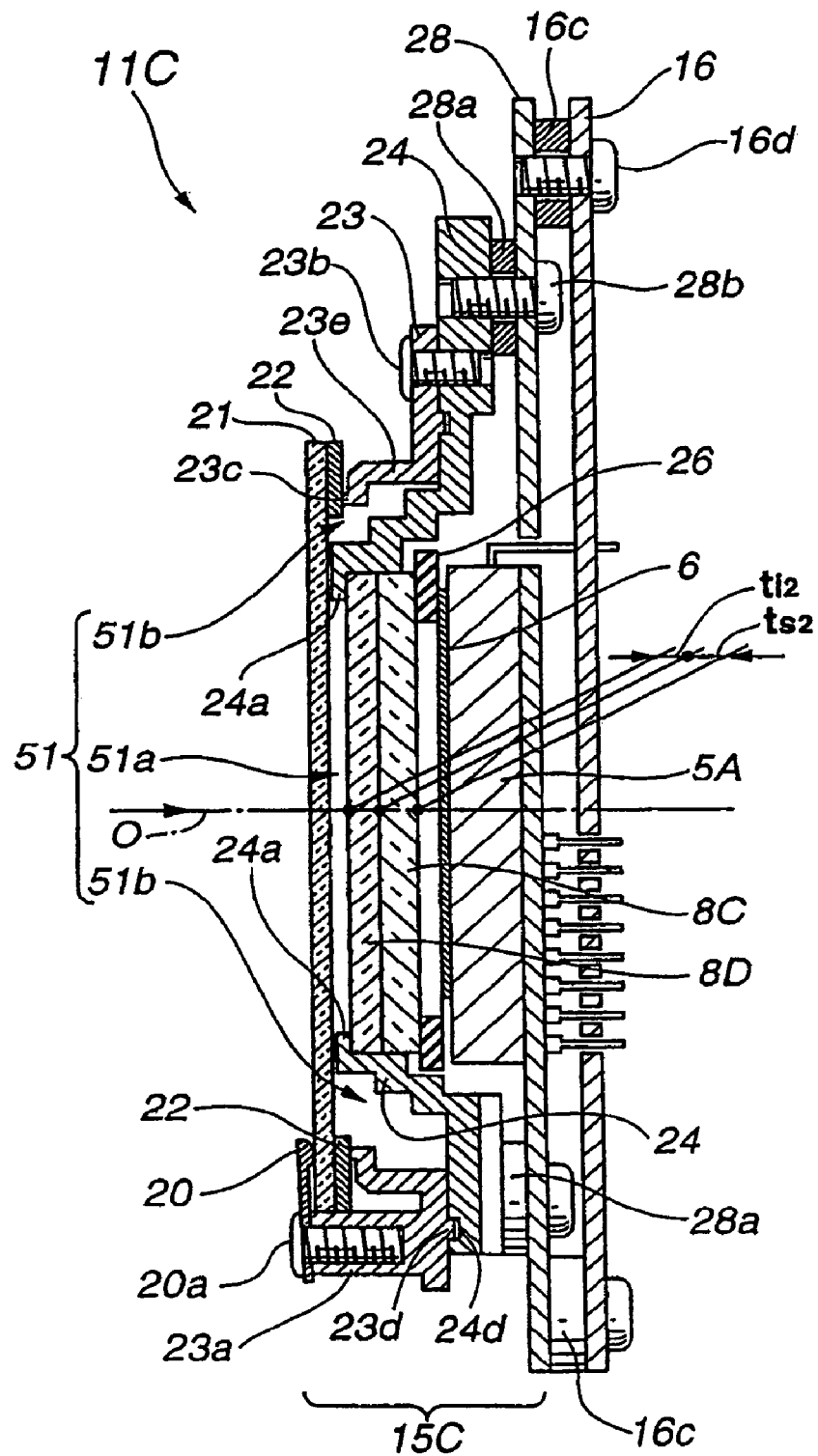
FIG. 7 is an enlarged sectional diagram of an image pickup unit to be applied to a first camera body in a digital camera system according to a second embodiment of the invention.
Figure 8:
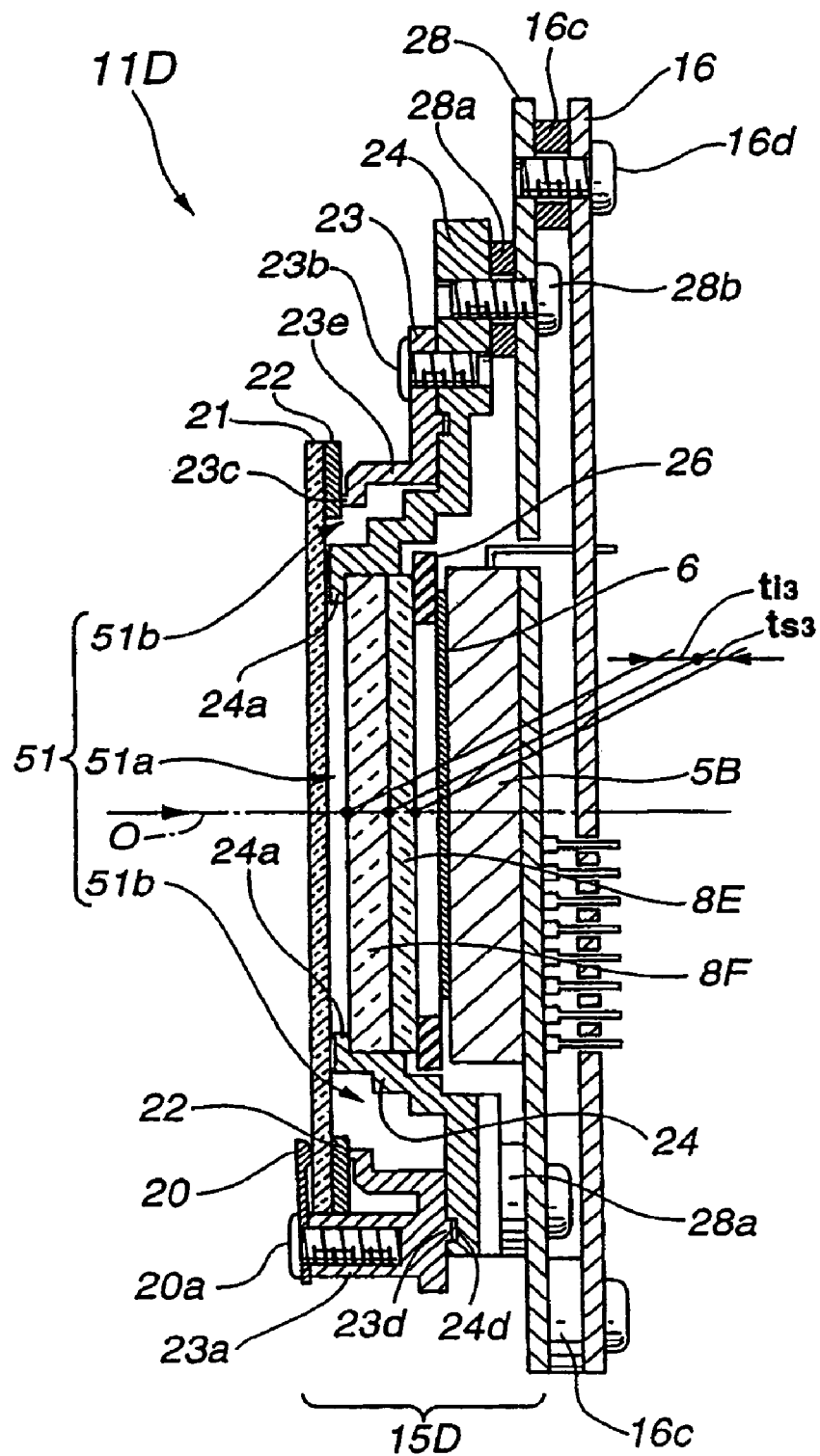
FIG. 8 is an enlarged vertical sectional diagram of an image pickup unit to be applied to a second camera body in the digital camera system according to the second embodiment in FIG. 7.

FIG. 7 is an enlarged vertical sectional diagram of an image pickup unit 15C in a first camera body in a digital camera system according to this embodiment. FIG. 8 is an enlarged vertical sectional diagram of an image pickup unit 15D in a second camera body in the digital camera system.

Like the first embodiment, the digital camera system according to this embodiment also includes: digital cameras. One digital camera which comprises an interchangeable lens barrel 12 in FIG. 2 having multiple interchangeable lenses and a first camera body 11C, which is a reference camera body; another digital camera which comprises an interchangeable lens barrel 12 and a second camera body 11D, which is a non-reference camera body, and an interchangeable lens barrels 12 having the same specification to be removably attached to the first camera body 11C and the second camera body 11D, respectively.

The first camera body 11C has the same construction as that of the first camera body 11A except for the contained optical LPF 8A of the image pickup unit 15A. The second camera body 11D has the same construction as that of the second camera body 11B except for the optical LPF 8B and the compensating optical element 9 in the image pickup unit contained in the second camera body 11B. Therefore, the same reference numerals are given to the same components, and only the different parts will be described below.

An image pickup unit 15C of the first camera body 11C contains an image pickup element 5A having a reference pixel pitch δ0 (about 7 μm). An optical LPF 8C and an infrared cut filter (infrared absorbing glass) 8D are provided on the front side.

The optical LPF 8C is constituted of a crystal plate having the same double refraction characteristic as that of the optical LPF 8A. The thickness ts2 is set in accordance with the reference pixel δ0 of the image pickup element 5A in order to prevent the occurrence of moiré (FIG. 18). The optical LPF 8C is the thickest in optical LPFs built in the non reference camera bodies such as the second camera body 11D.

The infrared cut filter 8D has the same refractive index as that of crystal but does not have a double refraction characteristic. The infrared cut filter 8D is set to have a thickness ti2 enough to absorb infrared rays.

A subject luminous flux captured through the attached interchangeable lens barrel 12 forms an image on the photoelectric conversion surface 5Aa (FIG. 1A) of the image pickup element 5A through the dust-preventive glass 21, the infrared cut filter 8D, the optical LPF 8C and the protective glass 6. The photoelectric conversion surface 5Aa is positioned at the position where the curvature-of-the-field aberration does not occur in consideration of an amount of the change in effective optical path length based on the refractive index of the optical LPF 5C.

On the other hand, the image pickup unit 15D of the second camera body 11D contains an image pickup element 5B having a pixel pitch δ1 different from the reference pixel pitch δ0. An optical LPF 8E and an infrared cut filter (infrared absorbing glass) 8F also used as a compensating optical system are provided on the front side. An photoelectric conversion surface 5Ba of the image pickup element 5B is disposed at the same position as that of the photoelectric conversion surface 5Aa of the image pickup element 5A.

The optical LPF 8E has the same double refraction characteristic as that of the optical LPF 8C and includes a crystal plate or an LN element. The thickness ts3 is set thinner than the thickness ts2 in accordance with the pixel pitch δ1 of the image pickup element 5B in order to prevent the occurrence of moiré.

The infrared cut filter 8F has the same refractive index as that of crystal but does not have a double refraction characteristic. The infrared cut filter 8F has a thickness ti3 sufficient for absorbing infrared rays and for compensating an amount of the decrease in thickness of the optical LPF 8E. In other words, the thickness of the infrared cut filter 8F is increased by an amount of the difference in thickness between the optical LPF 8E and the optical LPF 8G. The sum ti3+ts3 of thickness of the infrared cut filter 8F and the optical LPF 8E is set substantially equal to the sum ti2+ts2 of thickness of the infrared cut filter 8D and the optical LPF 8C. Therefore, a subject luminous flux captured through the interchangeable lens barrel 12 can form an image properly on the photoelectric conversion surface 5Ba (FIG. 1B) of the image pickup element 5B through the dust-preventive glass 21, the infrared cut filter 8F, the optical LPF 8E and the protection glass 6 in the second camera body 11D without the occurrence of the curvature-of-the-field aberration.

When the pixel pitch δ1 of the image pickup element 5B applied to the second camera body 11D is smaller than the reference pixel pitch δ0, the thickness ts3 of the optical LPF 8E is thinner while the thickness ti3 of the infrared cut filter 8F is increased by the amount of the decrease in the thickness ts3 like the first embodiment. When the pixel pitch δ1 of the image pickup element 5B applied in the second camera body 11D is larger than the reference pixel pitch δ0, a thinner LN element is applied as the optical LPF 8E like the first embodiment. The thickness ts3 is thin but still can be produced (0.1 mm or larger). The thickness ti3 of the infrared cut filter 8F is increased by the amount of the decrease in the thickness ts3 (where, strictly speaking, the thickness ti3 of the infrared cut filter 8F must be determined in consideration of the difference in refractive index between an LN element and crystal). Therefore, the sum of the thickness of the infrared cut filter 8F and the optical LPF 8E does not change substantially, and the image pickup unit 15C and the image pickup unit 15D take up the same amount of space. The thickness of the optical LPF 8C of the first camera body 11C is the thickest of the optical LPFs built in the other non-reference camera bodies such as the second camera body 11D.

As described above, the same effects can be obtained as those of the first embodiment even in a digital camera system according to this embodiment. The interchangeable lens barrel 12 having the same specification can be removably attached to the first camera body 11C on the reference side and the second camera body 11D on the non-reference side. Subject luminous fluxes of both of the camera bodies can form an image on the photoelectric conversion surface of the image pickup element at the same position without the curvature-of-the-field aberration.

According to this embodiment, the image pickup units 15C and 15D take up the same amount of space within the camera bodies according to this embodiment. Therefore, the other components in the first camera body 11C and the second camera body 11D can be arranged under the same condition.

Figure 9A:
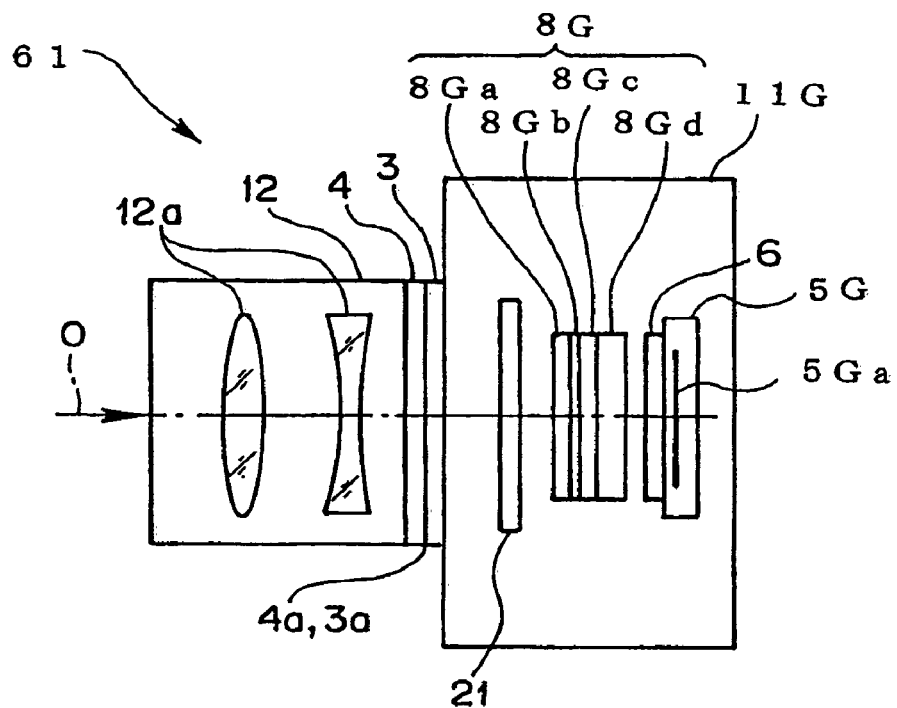
FIG. 9A illustrates the combined state of a standard camera body and an interchangeable lens, optical members and an image pickup element thereof, in a digital camera system in accordance with a third embodiment of the present invention.
Figure 9B:
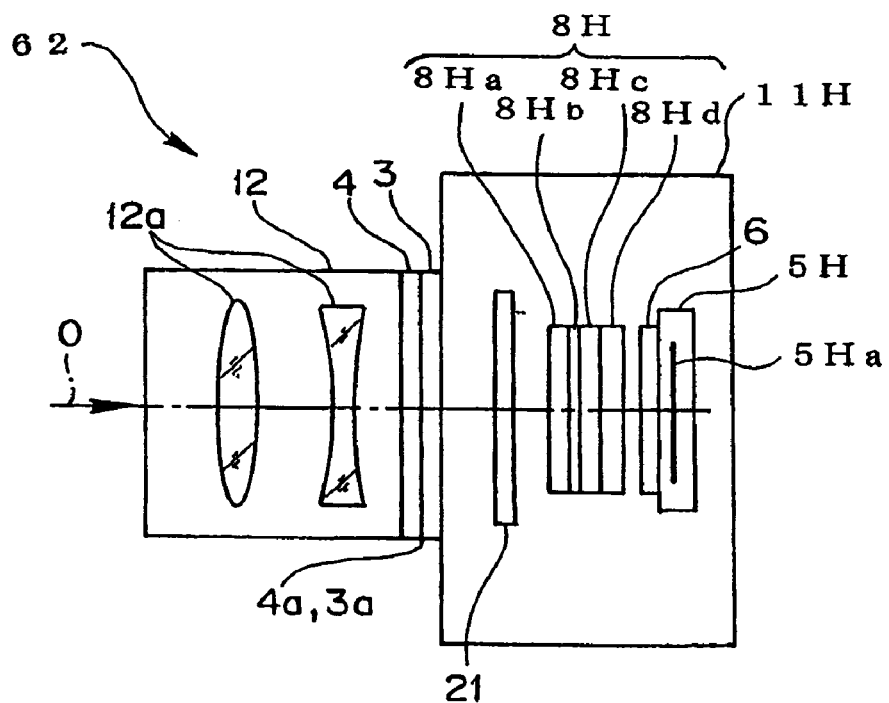
FIG. 9B illustrates the combined state of a non-standard camera body and an interchangeable lens, optical members and an image pickup element thereof, in a digital camera system in accordance with the third embodiment of the present invention.

A digital camera system of a third embodiment of the present invention is described below with reference to FIGS. 9A and 9B. FIGS. 9A and 9B illustrate a camera body and an interchangeable lens combined in a digital camera system in accordance with the third embodiment of the present invention. Also shown are an optical member and an image pickup element which are contained therein. FIG. 9A is an illustration of a combination of a standard camera body and an interchangeable lens. FIG. 9B is an illustration of a combination of a non-standard camera body and the interchangeable lens.

The digital camera system of the third embodiment includes a digital camera 61 shown in FIG. 9A and a digital camera 62 shown in FIG. 9B.

The digital camera 61 includes a first camera body 11G and an interchangeable lens barrel 12 detachably attached to the first camera body 11G.

The digital camera 62 includes a second camera body 11H as a non-standard camera body, and an interchangeable lens barrel 12 having the same specifications as the one mounted on the first camera body 11G.

The first camera body 11G includes an image pickup element 5G as a first image pickup element constituted of a CCD (or a CMOS image pickup element) having a protection glass 6 in front thereof, an optical LPF 8G as a first optical LPF including an infrared absorbing glass 8Gb arranged in front of the image pickup element 5G, and a dust-preventive filter 21 for protecting the image pickup element 5G and the optical LPF 8G from dust. The dust-preventive filter 21, the optical LPF 8G, and the protection glass 6 form the first optical unit including a plurality of optical elements.

The first camera body 11G includes a camera-side mount portion 3 having a camera-side mount surface 3a to be engaged with a lens-side mount surface 4a of a lens-side mount portion 4. When the lens-side mount portion 4 is engaged with and secured to the camera-side mount portion 3, relative positions of the lens and the first camera body 11G in the optical axis direction are defined with the abutment of the lens-side mount surface 4a and the camera-side mount surface 3a.

The image pickup element 5G, of a 4/3 type image pickup element, has a predetermined standard pixel pitch $\delta 0$ (corresponding to the standard number of pixels S0), as a first pixel pitch. An image of a subject formed on a photoelectric conversion surface (image-forming surface) 5Ga as an image-forming surface of the image pickup element is photoelectrically converted into an electrical signal.

The optical LPF 8G includes crystal plates 8Ga, 8Gc, and 8Gd, which are optical crystals, having predetermined thicknesses and double refractions in predetermined directions in order to split rays of light in response to the standard pixel pitch $\delta 0$ of the image pickup element 5G to control the generation of moiré. The optical LPF 8G also includes an infrared absorbing glass 8Gb.

For forming the optical LPF 8G which achieves four square corner separation (an incident ray of light is split into four rays that pass through the four corners of a square having one side equal to the pixel pitch) when the standard pixel pitch is set to $\delta 0=7$ µm, the crystal plates 8Ga, 8Gc, and 8Gd need to have the following specifications: the crystal plate 8Ga has a thickness of t2=0.84 mm with an angle of rotation of 45°, the crystal plate 8Gc has a thickness of t4=0.84 mm with an angle of rotation of −45°, and the crystal plate 8Gd has a thickness of t5=1.19 mm with an angle of rotation of 0°. The refractive indices n2, n4, and n5 of the crystal plate 8Ga, 8Gc, and 8Gd are 1.544. The infrared absorbing glass 8Gb, made of phosphate glass and fluorophosphates glass, has a refractive index n3 of 1.542 and a thickness t3 of 0.5 mm. Although no particular specification is set on the dust-preventive filter 21 arranged in front of the optical LPF 8G, an optical glass having a thickness t1 of 1.0 mm and a refractive index n1 of 1.52 is used here for the duet-preventive filter 21. The protection glass 6 arranged in front of the image pickup element has a thickness t6 of 0.6 mm and a refractive index n6 of 1.52.

The above-referenced refractive indices are determined based on light of a wavelength of 587.6 nm. Hereinafter, unless otherwise particularly noted, light of a wavelength of 587.6 nm is used.

The optical LPF 8G is arranged between the camera-side mount portion 3 and the image pickup element 5G. The optical LPF 8G is as thick as or thicker than each of an optical LPF 8H of the second camera body 11H to be discussed later and an optical LPF applied to a non-standard camera body permitting the same interchangeable lens barrel 12 to be mounted thereon.

The interchangeable lens barrel 12 includes a lens-side mount portion 4 having a lens-side mount surface 4a that is engaged with a camera-side mount surface 3a of the first camera body or the second camera body. The interchangeable lens barrel 12 also contains a photographic optical system 12a having a plurality of imaging lenses. The interchangeable lens barrel 12 having the same specifications can be attached to any of the first camera body 11G and the second camera body 11H. The interchangeable lens barrel 12 may be any of a plurality of interchangeable lenses such as interchangeable lenses different in focal length, a zoom lens, a macro lens.

The photographic optical system 12a of the interchangeable lens barrel 12 mounted on the standard camera body 11G allows a subject luminous flux to pass through the dust-preventive filter 21 and the optical LPF 8G, thereby forming a subject image on the image-forming surface 5Ga of the image pickup element 5G. The photographic optical system 12a is designed such that the subject image is formed on the image-forming surface 5Ga in a state free from curvature of the field, spherical aberration, astigmatism, etc. even when effective optical path length changes due to variations in refractive index and thickness of the optical LPF 8G. More specifically, both an image-forming point P1' arising from the central luminous flux and an image-forming point P2' arising from the peripheral luminous flux are positioned on the image-forming surface 5Ga of the image pickup element 5G in a curvature-of-the-field free state as shown in FIG. 17.

The second camera body 11H includes an image pickup element 5H as a second image pickup element constituted of a CCD (MOS type image pickup element) having a protection glass 6 and the like, the optical LPF 8H arranged in front of the image pickup element 5H, and a dust-preventive filter 21 for protecting the image pickup element 5H and the optical LPF 8H. The optical LPF 8H includes a crystal plate 8Ha, a infrared light absorbing glass 8Hb, a crystal plate 8Hc serving as a depolarization plate for compensating for the optical path, and a crystal plate 8Hd. The dust-preventive filter 21, the optical LPF 8H, and the protection glass 6 form the second optical unit having a plurality of optical elements.

The second camera body 11H is provided with a camera-side mount portion 3 with the same specification as the first camera body 11G that includes the camera-side mount surface 3a to be engaged with the lens-side mount surface 4a.

Like the image pickup element 5G, the image pickup element 5H is of a 4/3 image pickup element type. The image pickup element 5H, however, has a pixel pitch of $\delta 1$ as a second pixel pitch different from the standard pixel pitch $\delta 0$. A subject image formed on a photoelectric conversion surface (image-forming surface) 5Ha as a forming surface of the image pickup element 5H is also photoelectrically converted into an electrical signal.

If the optical LPF 8H is constructed of the same crystal plate as the optical LPF 8G in accordance with a pixel pitch of $\delta 1$, the optical LPF 8H becomes different in thickness from the optical LPF 8G.

For example, if an optical LPF 8H having the same structure as the optical LPF 8G which achieves four square corner separation (an incident ray of light is split into four rays that pass through the four corners of a square having one side equal to the pixel pitch) when the pixel pitch $\delta=5$ µm, a crystal plate corresponding to the crystal plate 8Ga has a thickness t2 of 0.60 mm with an angle of rotation of 45°, a crystal plate corresponding to the crystal plate 8Gc has a thickness t4 of 0.60 mm with an angle of rotation of −45°, and a crystal plate corresponding to the crystal plate 8Gd has a thickness t5 of 0.85 mm with an angle of rotation of 0°. A total thickness of the crystal plates in optical LPF 8G becomes thinner by 0.82 mm than with the pixel pitch δ0 of 7 μ. The refractive indices n2, n4, and n5 of the respective crystal plates are 1.544. A crystal plate corresponding to the infrared absorbing glass 8Gb, made of phosphate glass or fluorophosphates glass, has a refractive index n3 of 1.542 and a thickness t3 of 0.5 mm. No limitations are imposed on material and thickness of the dust-preventive filter 21, and a crystal plate having a refractive index n1 of 1.52 and a thickness t1 of 1 mm is used here for the dust-preventive filter 21. The protection glass 6 has a refractive index n6 of 1.52 and a thickness t6 of 0.6 mm. The use of the crystal plates having different thicknesses changes the optical path length of the optical unit arranged between the interchangeable lens and the image pickup element, thereby degrading the curvature of the field of the interchangeable lens.

To overcome such a drawback, the second optical unit containing the optical LPF 8H of FIG. 9B is used. The crystal plate 8Ha has a thickness t2 of 0.85 with an angle of rotation of 0°. The crystal plate 8Hc is a depolarization plate having a thickness t4 of 1.17 mm. The crystal plate 8Hd has a thickness t5 of 0.85 mm with an angle of rotation of 90°. The refractive indices n2, n4, and n5 of the respective crystal plates are 1.544. The optical LPF 8H has an overall thickness of 2.87 mm, namely, equal to the overall thickness with the standard pixel pitch of δ0 of 7 μm, and is constructed of the same material, namely, crystal. Further, the dust-preventive filter 21, as the remaining optical element of the second optical unit, the infrared light absorbing glass 8Hb in the optical LPF 8H, and the protection glass 6 have the same refractive indices and the same thicknesses as those discussed with the standard pixel pitch δ0 of 7 μm. More specifically, the dust-preventive filter 21 has a thickness t1 of 1 mm and a refractive index n1 of 1.52, the infrared light absorbing glass 8Hb has a thickness t3 of 0.5 mm and a refractive index n3 of 1.542, and the protection glass 6 has a thickness t6 of 0.6 mm and a refractive index n6 of 1.52. Accordingly, the optical path length of the second image pickup element is equal to the optical path length of the first image pickup element. The crystal plate 8Hc, as the depolarization plate, has no effect of splitting a ray of light, and has only a depolarization effect. Therefore, the thickness of the crystal plate 8Hc is flexibly set. The depolarization plate thus compensates for the difference occurring in the optical path length of the optical unit.

Figure 10A:
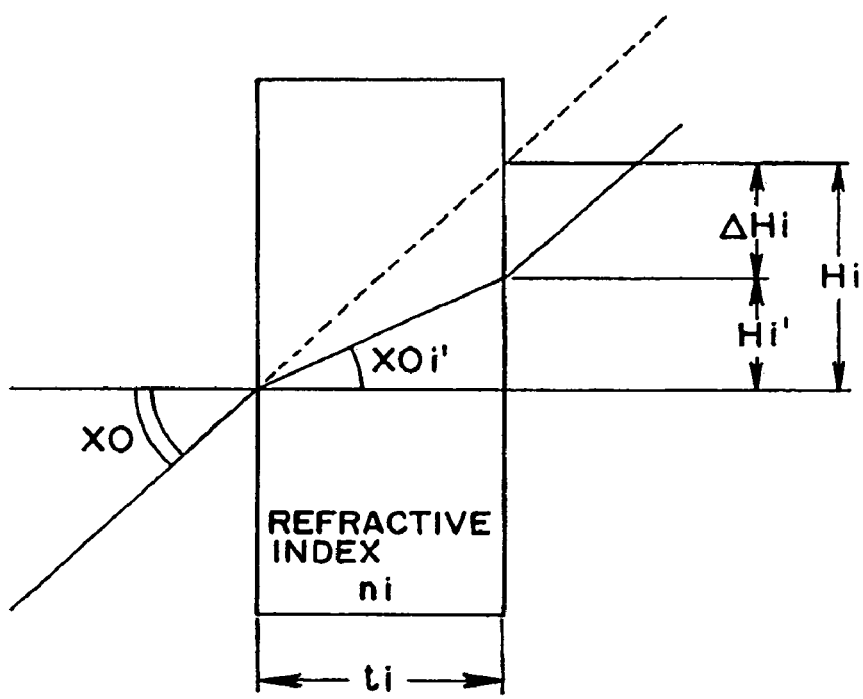
FIG. 10A illustrates a deviation, ΔHi, of a ray incident at an inclination angle of X0 with respect to the optical element (in standard camera body) in the digital camera system of FIGS. 9A and 9B.
Figure 10B:
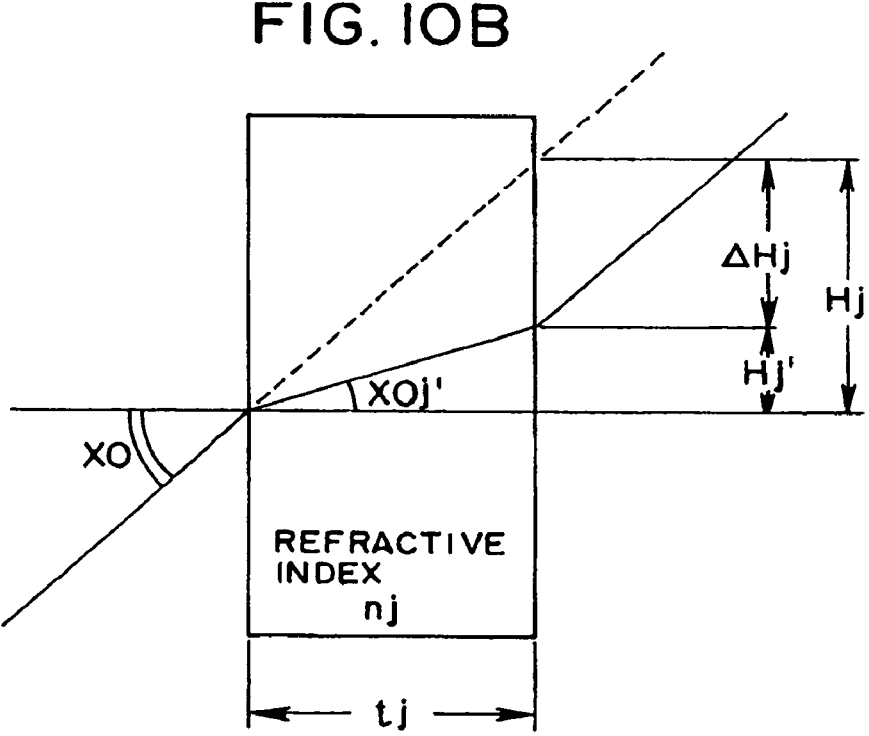
FIG. 10B illustrates a deviation, ΔHj, of a ray incident at an inclination angle of X0 with respect to the optical element (in non-standard camera body) having a different thickness and a different refractive index in the digital camera system of FIGS. 9A and 9B.

FIGS. 10A and 10B illustrate amounts of deviation ΔHi and ΔHj of rays incident on the optical element at an inclination angle of X0. FIG. 10A illustrates a ray deviation amount ΔHi of one optical element (on the standard camera body side) having a thickness of ti and a refractive index of ni. FIG. 10B illustrates a ray deviation amount ΔHj of the other optical element (on the non-standard camera body) having a thickness of tj and a refractive index of nj. As shown, Hi and Hj represent heights at an extension of an incident light, and Hi' and Hj' represent heights of the refracted ray at the exit point thereof. The ray deviation amount ΔHi is a difference between Hi and Hi' and the ray deviation amount ΔHj is a difference between Hj and Hj'. Optical equivalence amounts (overall deviation amounts) of each of the optical units including the previously discussed optical elements are determined by summing the ray deviation amounts ΔHi of the optical elements or by summing the ray deviation amount ΔHj of the optical elements.

Aberrations of the image lenses in the direction of magnification remain equal if the ray deviation amount ΔHi equals the ray deviation amount ΔHj, in other words, if the optical equivalent values equal each other. The difference in the effective optical path length becomes zero if the ratio of the ray deviation amounts, ΔHj/ΔHi=1.

The optical equivalent value of the optical unit in the third embodiment, including the dust-preventive filter 21, the optical LPF 8G, and the protection glass 6 in the third embodiment is calculated with the standard pixel pitch δ0 of 7 μm (with respect to the effective optical path length) as follows:

$$\Sigma tix(1-ni)/ni = 1.00 \times (1-1.52)/1.52 + 0.84 \times (1-1.544)/1.544 +$$
$$0.50 \times (1-1.542)/1.542 + 0.84 \times (1-1.544)/1.544 +$$
$$1.19 \times (1-1.544)/1.544 + 0.60 \times (1-1.52)/1.52$$
$$= -1.734$$

In comparison with the optical LPF of standard pixel pitch δ0 of 7 μm, the optical equivalent value (with respect to the effective optical path length) of the optical LPF with the pixel pitch δ1 of 5 μm is calculated as follows:

$$\Sigma tix(1-ni)/ni = 1.00 \times (1-1.52)/1.52 + 0.60 \times (1-1.544)/1.544 +$$
$$0.50 \times (1-1.542)/1.542 + 0.60 \times (1-1.544)/1.544 +$$
$$0.85 \times (1-1.544)/1.544 + 0.60 \times (1-1.52)/1.52$$
$$= -1.445$$

In this case, the optical equivalent value of the second optical unit fails to match the optical equivalent value of the first optical unit so that a change in the optical path length cannot be compensated.

The optical equivalent value of the second optical unit including the dust-preventive filter 21, the optical LPF 8H as the depolarization.plate, and the protection glass 6 with the pixel pitch δ1 of 5μ is calculated as follows:

$$\Sigma tjx(1-nj)/nj = 1.00 \times (1-1.52)/1.52 + 0.85 \times (1-1.544)/1.544 +$$
$$0.50 \times (1-1.542)/1.542 + 1.17 \times (1-1.544)/1.544 +$$
$$0.85 \times (1-1.544)/1.544 + 0.60 \times (1-1.52)/1.52$$
$$= -1.734$$

The first optical unit and the second optical unit have the same optical equivalent value.

In accordance with the third embodiment, the depolarization plate is used to equalize the optical equivalent value. Alternatively, the optical equivalent values can be equalized by adjusting the thickness and the refractive index of the dust-preventive filter, the thickness of the infrared light absorbing glass, and the thickness and the refractive index of the protection glass. Alternatively, a plane-parallel dummy glass may be added to adjust the optical equivalent value. In accordance with the third embodiment, the optical equivalent value is changed by modifying the pixel pitch. However, a variation of the optical path length of the optical unit, even if caused by a change in the thickness and material of the optical element, can be compensated for. Even if an optical element itself is removed in design, compensation is still possible.

The material of the optical LPF is made of crystal. Alternatively, the optical LPF may be constituted of a lithium niobate (LN) element.

FIG. 11 is a graph plotting the relationship between the incident angle X0 and the ray deviation amount ratio ΔHj/ΔHi with the optical equivalent values set to be equal to each other. The ray deviation amount ΔHi is plotted with reference to a refractive index ni of 1.5. The ray deviation amount ΔHj is plotted with respect to refractive indices nj of 1.4, 1.8, 2, 2.2, and 2.4.

FIG. 11 shows that an optical deviation ratio is about 1 (an error of 1 percent or less) in response to the incident angle of 15° or less, and does not create optical aberration in a typically available optical material having a refractive index of 1.4-2 in response to light having a wavelength of 587.6 nm. A refractive index of 2.4 is obtained when the LN element is used for an optical low-pass filter. The optical deviation ratio can be set to be about 1 even if a particular material having a high refractive index, such as the LN element, is used. As shown in FIG. 11, the refractive index is plotted in response to light having a wavelength of 587.6 nm. In other light having a wavelength ranging from 486.1 nm to 626.3 nm, an optical material can be selected so that the optical deviation ratio becomes about 1. In this way, variations in chromatic aberration are controlled. In the digital camera, light having a wavelength ranging from 420 nm to 650 nm plays an important role in forming a subject image. If the optical deviation ratio is set to be about 1 in that range, the effect of aberrations on the image is controlled.

The digital camera 61 and the digital camera 62 in the digital camera system of the third embodiment are described below with reference to FIGS. 12 and 13.

Figure 12:
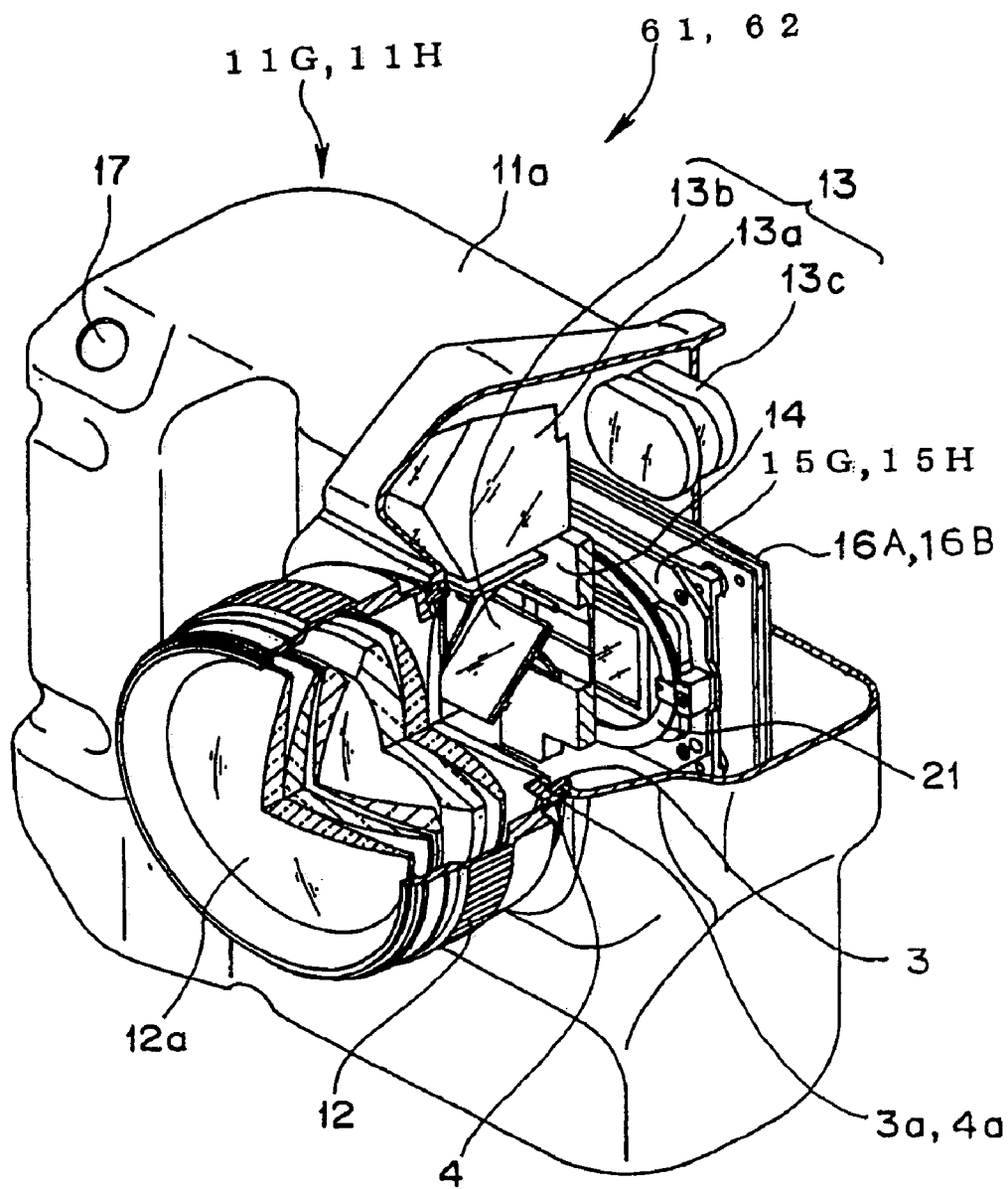
FIG. 12 is a perspective view of a camera body of the digital camera of FIGS. 9A and 9B with a interchangeable-lens barrel mounted, with a portion thereof being cut away to reveal the internal structure thereof.

FIG. 12 is a partially cutaway perspective view illustrating an internal structure of the camera body of the digital camera with an interchangeable lens mounted. FIG. 13 is a partially cutaway perspective view illustrating an internal structure of an image pickup unit of the digital camera.

Each of the digital camera 61 and the digital camera 62 includes an interchangeable lens barrel 12 having the same specifications, and the first camera body 11G as the standard camera or the second camera body 11H as the non-standard camera body, each body permitting the interchangeable lens barrel 12 to be mounted thereon. The interchangeable lens barrel 12 is mounted with the lens-side mount surface 4a of the lens-side mount portion 4 abutted with the camera-side mount surface 3a of the camera-side mount portion 3.

The first camera body 11G and the second camera body 11H are only different from each other in the image pickup element of the internal image pickup unit and the optical LPF, and are identical to each other in the other elements.

The interchangeable lens barrel 12 includes the photographic optical system 12a including a plurality of lenses, and a drive mechanism for driving the plurality of lenses. The photographic optical system 12a permits the luminous flux from a subject to pass therethrough, thereby forming the image of the subject on a predetermined position (the photoelectric conversion surface of the image pickup element 5G or the image pickup element 5H shown in FIG. 13) in a state free from a variety of aberrations including a curvature of the field. More specifically, the curvature of the field that could be caused by the optical LPF arranged in front of the image pickup element is eliminated in design.

The state free from aberrations means a state that there is an aberration at a level that practically presents no problem. In other words, the photographic optical system 12a is designed taking into consideration the optical LPF arranged on the surface of the image pickup element so that a variety of aberrations are optimized.

Each of the first camera body 11G and the second camera body 11H is a so-called "single lens reflex" camera body, including a variety of members in a camera body portion 11a and the camera-side mount portion 3 that permits the interchangeable lens barrel 12 having the photographic optical system 12a to be detachably attached thereto. An exposure opening, formed in approximately the center of the front of the camera body portion 11a, has a predetermined diameter through which the subject luminous flux is guided into the camera main unit ha. The camera-side mount portion 3 is formed surrounding the edge portion of the exposure opening.

The internal structure of each of the first camera body 11G and the second camera body 11H is described in detail below. A variety of controls for operating the camera main unit 11a are arranged on predetermined locations on the top and back of the camera main unit 11a. For example, a release button 17 for generating a command signal to start a photographing action.

The camera body portion 11a includes and arranges various components at predetermined positions, as shown in FIG. 12, including a finder device 13, a shutter portion 14, an image pickup unit 15G (for the first camera body) or 15H (for the second camera body), multiple circuit substrates including main circuit substrate 16A (for the first camera body) or 16B (for the second camera body) and the like. The finder device 13 is provided for forming a desired subject image by the photographic optical system 12a, for example, on a predetermined position different from the photoelectric conversion surface of the image pickup elements 5G and 5H. The finder device 13 constitutes a so-called "observation optical system". The shutter portion 14 includes a shutter mechanism, for controlling the time for irradiating a subject luminous flux to the photoelectric conversion surface of the image pickup element 5H. The image pickup unit 15G or 15H includes an image pickup element for obtaining subject image signals based on the subject luminous flux having passed through the photographic optical system 12a. Various electric members of electric circuits are implemented on the main circuit substrate 16A or 16B. The electric circuits include an image signal processing circuit for performing various kinds of signal processing on image signals obtained by the image pickup element 5G or 5H. A dust-preventive filter 21 is provided in front of the surface of each of the image pickup units 15G and 15H. The dust-preventive filter 21 prevents the deposition of dust to the photoelectric conversion surface of an image pickup element.

The finder device 13 includes a reflector 13b, a pentaprism 13a and an eyepiece 13c. The reflector 13b is arranged to bend an optical axis of a subject luminous flux having passed through the photographic optical system 12a and to guide the subject luminous flux to the observation optical system side. The pentaprism 13a receives a luminous flux reflected from the reflector 13b and forms an erect image thereof. The eyepiece 13c is used for enlarging and observing a subject image.

The reflector 13b is freely movably arranged between a position retreated from the optical axis of the photographic optical system 12a and a predetermined position on the optical axis. The reflector 13b is normally disposed at a predetermined angle, such as 45°, with respect to the optical axis of the photographic optical system 12a. When the camera 1 is at the normal state, a subject luminous flux having passed through the photographic optical system 12a is reflected by the reflector 13b and is reflected toward the pentaprism 13a disposed above the reflector 13b.

On the other hand, while the camera 1 is performing a photographic operation and during the real exposure operation, the reflector 13b can move to a predetermined position where the reflector 13b is retracted from the optical path of the photographic optical system 12a. The subject luminous flux is guided to the image pickup element side to be directed to irradiate the photoelectric conversion surface.

The shutter portion 14 is constituted of similar to those generally used in a conventional camera or the like, such as a focal plane type shutter mechanism and a driving circuit for controlling operations of the shutter mechanism.

The image pickup units 15G and 15H for the first and second camera bodies, respectively, have substantially the same construction except for the image pickup elements and optical LPFs. The image pickup unit 15G for the first camera body is described first.

The image pickup unit 15G includes the image pickup element 5G, an image pickup element fixing plate 28, the optical LPF 8G, a low-pass filter receiving member 26, an image pickup element storage case member 24 (called CCD case 24 hereinafter), a dust-preventive filter receiving member 23, a dust-preventive filter 21, a piezoelectric element 22 and a press member 20. The image pickup element 5G is constituted of a CCD and the like obtaining image signals corresponding to the light directed to irradiate the photoelectric conversion surface of the image pickup element 5G through the photographic optical system 12a. The image pickup element fixing plate 28 is constituted of a thin-plate like member for fixing and supporting the image pickup element 5G. The optical LPF 8G is an optical unit in front of the photoelectric conversion surface of the image pickup element 5G, for removing high frequency components from a subject luminous flux directed and irradiated through the photographic optical system 12a. The low-pass filter receiving member 26 is constituted of an elastic member substantially in a frame shape and is provided on the edge portion between the optical LPF 8G and the image pickup element 5G. The CCD case 24 stores, fixes and holds the image pickup element 5G and supports the optical LPF 8G by closely abutting to the edge portion and the vicinity. A predetermined position of the CCD case 24 is closely in contact with the dust-preventive filter receiving member 23. The dust-preventive filter receiving member 23 is provided in front of the surface side of the CCD case 24 and is closely in contact with the edge portion or the vicinity. The dust-preventive filter 21 is a dust-preventive member supported by the dust-preventive filter receiving member 23 and faces toward the optical LPF 8G at a position spaced apart from the optical LPF 8G by a predetermined distance in front of the surface side of the optical LPF 8G in front of the photoelectric conversion surface side of the image pickup element 5G. The piezoelectric element 22 is provided on the edge portion of the dust-preventive filter 21 and removes dust by giving a predetermined amount of vibration to the dust-preventive filter 21. The press member 20 is constituted of an elastic body connecting, fixing and holding the dust-preventive filter 21 to the dust-preventive filter receiving member 23 in an air-tight manner.

The image pickup element 5G performs photoelectric conversion processing on subject luminous fluxes received by the photoelectric conversion surface 5Ga (FIG. 9A) of the image pickup element 5G through the photographic optical system 12a. Thus, the image pickup element 5G can obtain image signals corresponding to the subject image on the photoelectric conversion surface. The image pickup element 5G may be a 4/3 type charge-coupled device. In this case, the standard pixel pitch $\delta 0$, which is a first pixel pitch, is substantially 7 µm, for example.

The image pickup element 5G is implemented at a predetermined position on the main circuit substrate 16A through the image pickup element fixing plate 28. An image signal processing circuit and work memory, not shown, are implemented together on the main circuit substrate 16. Thus, output signals from the image pickup element 5G, that is, image signals obtained through photoelectric conversion processing are transmitted to the image signal processing circuit. The protection glass 6 (FIG. 13) is attached in front of the photoelectric conversion surface of the image pickup element 5G.

The signal processing performed in the image signal processing circuit includes various kinds of signal processing such as processing for converting image signals obtained from the image pickup element 5G to signals suitable for recording. In this case, the image signals correspond to the image formed on the photoelectric conversion surface of the image pickup element 5G by the photographic optical system 12a held within the lens barrel 12 attached to the body side mount portion 3. These kinds of signal processing are the same as processing normally performed in a general digital camera for handling electronic image signals.

The optical LPF 8G is provided in front of the surface side of the image pickup element 5G with the low-pass filter receiving member 26 between. The optical LPF 8G contains crystal, which is an optical unit having a double refraction characteristic. As described later, the optical LPF 8G has a thickness ts4 corresponding to a pixel pitch (about 7 µm) of the image pickup element 5G. The optical LPF 8G further contains an infrared absorbing glass, as described later.

The CCD case 24 is arranged in such a way to cover the optical LPF 8G. The CCD case 24 has a rectangular opening at approximately the center thereof. The optical LPF 8G and image pickup element 5G are provided in the opening from the back. A step 24a having a substantially L-shaped section is provided on the internal edge portion on the back side of the opening.

As described above, the low-pass filter receiving member 26 constituted of an elastic member is provided between the optical LPF 8G and the image pickup element 5G. The low-pass filter receiving member 26 is provided at a position avoiding an effective range of the photoelectric conversion surface on the edge portion of the front side of the image pickup element 5G. Furthermore, the low-pass filter receiving member 26 is abutted to the vicinity of the edge portion of the back side of the optical LPF 8G. The optical LPF 8G and the image pickup element 5G are in contact with each other substantially in an air-tight manner. Elastic force toward the optical axis by the low-pass filter receiving member 26 acts on the optical LPF 8G.

The edge portion of the front side of the optical LPF 8G is disposed so as to be in contact with the step 24a of the CCD case 24 substantially in an air-tight manner. Thus, the position of the optical LPF 8G in the optical axis direction is controlled against an elastic force of the low-pass filter receiving member 26, the elastic force working to move the optical LPF 8G in the optical axis.

In other words, the optical LPF 8G laid within the opening of the CCD case 24 from the back side is positionally controlled by the step 24a in the optical axis direction. The optical LPF 8G is prevented from coming out from the inside of the CCD case 24 toward the front side.

In this way, after the optical LPF 8G is inserted from the back side into the opening of the CCD case 24, the image pickup element 5G is disposed on the back side of the optical LPF 8G. The low-pass filter receiving member 26 is held at the edge portion between the optical LPF 8G and the image pickup element 5G.

As described above, the image pickup element 5G is mounted on the main circuit substrate 16 with the image pickup element fixing plate 28 interposed therebetween. The image pickup element fixing plate 28 is fixed to the CCD case 24 from behind with a screw 28b tightened into a screw hole 24e with a spacer 28a interposed therebetween. The main circuit substrate 16A is fixed to the image pickup element fixing plate 28 with a screw 16d via a spacer 16c.

The dust-preventive filter receiving member 23 is fixed to the front side of the CCD case 24 with a screw 23b tightened into the screw hole 24b of the CCD case 24. A circular groove 24d in a substantially ring shape is provided at a predetermined position in front of the edge portion of the CCD case 24. On the other hand, a ring-shape projection 23d to fit into the circular groove 24d of the CCD case 24 is provided in a substantially-ring form at a predetermined position on the back surface of the edge side of the dust-preventive filter receiving member 23. When the ring-shape projection 23d fits into the circular groove 24d, the CCD case 24 and the dust-preventive filter receiving member 23 fit into each other substantially in an air-tight manner in a ring-shaped area, that is, in an area having the circular groove 24d and the ring-shaped projection 23d.

The dust-preventive filter 21 is constituted of glass and is a circular or polygonal plate as a whole. An area extending to emitting directions, with some extent, at least from the center of the dust-preventive filter 21 to the edge is transparent. The transparent area faces toward the front side of the optical LPF 8G with a predetermined space maintained therebetween.

The piezoelectric element 22 is bonded on the edge portion of back surface of the dust-preventive filter 21 with adhesive means, for example, such that the piezoelectric element 22 is integrated to the edge portion. The piezoelectric element 22 is a predetermined vibrating member giving vibrations to the dust-preventive filter 21 and includes an electromechanical conversion element and the like. The piezoelectric element 22 can cause a predetermined amount of vibration in the dust-preventive filter 21 by applying a predetermined driving voltage from the outside.

The dust-preventive filter 21 is fixed and is held by the press member 20 so that the dust-preventive filter 21 can be engaged with the dust-preventive filter receiving member 23 in an air-tight manner. The press member 20 is constituted of an elastic body such as a flat spring.

The dust-preventive filter receiving member 23 has a circular or polygonal opening in the vicinity of approximately the center of the dust-preventive filter receiving member 23. The opening is designed to be large enough for subject luminous fluxes passing through the photographic optical system 12a to irradiate the photoelectric conversion surface of the image pickup element 5G at the back.

A wall 23e in a substantially ring shape extends forward from the edge portion of the opening, shown best in FIG. 5. A receiver 23c extends toward the front side from the distal end of the wall 23e.

Multiple (three, in this embodiment) projecting portions 23a extend forward from predetermined positions on the external edge portion of the front side of the dust-preventive filter receiving member 23. Each of the projecting portions 23a can fix the press member 20 fixing and holding the dust-preventive filter 21. The press member 20 is fixed to the distal end of the projecting portion 23a with fastening means such as a screw 20a.

The press member 20 includes an elastic body such as a flat spring, as described above. The proximal end of the press member 20 is fixed to the projecting portion 23a, and the free end is abutted to the external edge portion of the dust-preventive filter 21. Thus, the dust-preventive filter 21 is pressed toward the dust-preventive filter receiving member 23 side, that is, toward the optical axis.

A predetermined position of the piezoelectric element 22 on the external edge portion of the back side of the dust-preventive filter 21 is abutted to the receiver 23c. Thus, the positions of the dust-preventive filter 21 and piezoelectric element 22 in the optical axis direction can be fixed. Accordingly, the dust-preventive filter 21 is fixed and held so as to engage with the dust-preventive filter receiving member 23 in an air tight manner via the piezoelectric element 22.

In other words, the dust-preventive filter receiving member 23 is forced by the press member 20 to press the piezoelectric element 22 and the dust-preventive filter 21 in an air-tight manner.

As described above, the dust-preventive filter receiving member 23 and the CCD case 24 fit into each other substantially in an air-tight manner with the circular groove 24d engaged with ring-shaped projection 23d. At the same time, the dust-preventive filter receiving member 23 and the dust-preventive filter 21 are forced by the press member 20 to be pressed toward each other in an air-tight manner with the piezoelectric element 22 interposed therebetween. The optical LPF 8G and the CCD case 24 are secured to each other substantially in an air-tight manner with the edge portion of the front side of the optical LPF 8G engaged with the step 24a of the CCD case 24. The image pickup element 5G is provided on the low pass filter receiving member 26 on the back side of the optical LPF 8G. The substantial air-tightness is also held between the optical LPF 8G and the image pickup element 5G.

A predetermined gap 51a is provided in a space between the optical LPF 8G and the dust-preventive filter 21. The edge side of the optical LPF 8G, that is, the CCD case 24, the dust-preventive filter receiving member 23 and the dust-preventive filter 21 form a space 51b. The space 51b is a sealed space extending toward the outside of the optical LPF 8G.

The space 51b is set to be larger than the gap 51a. A sealed space 51 includes the gap 51a and the space 51b. The space 51 is defined by the CCD case 24, the dust-preventive filter receiving member 23, the dust-preventive filter 21 and the optical LPF 8G substantially in an air-tight manner.

Figure 14:
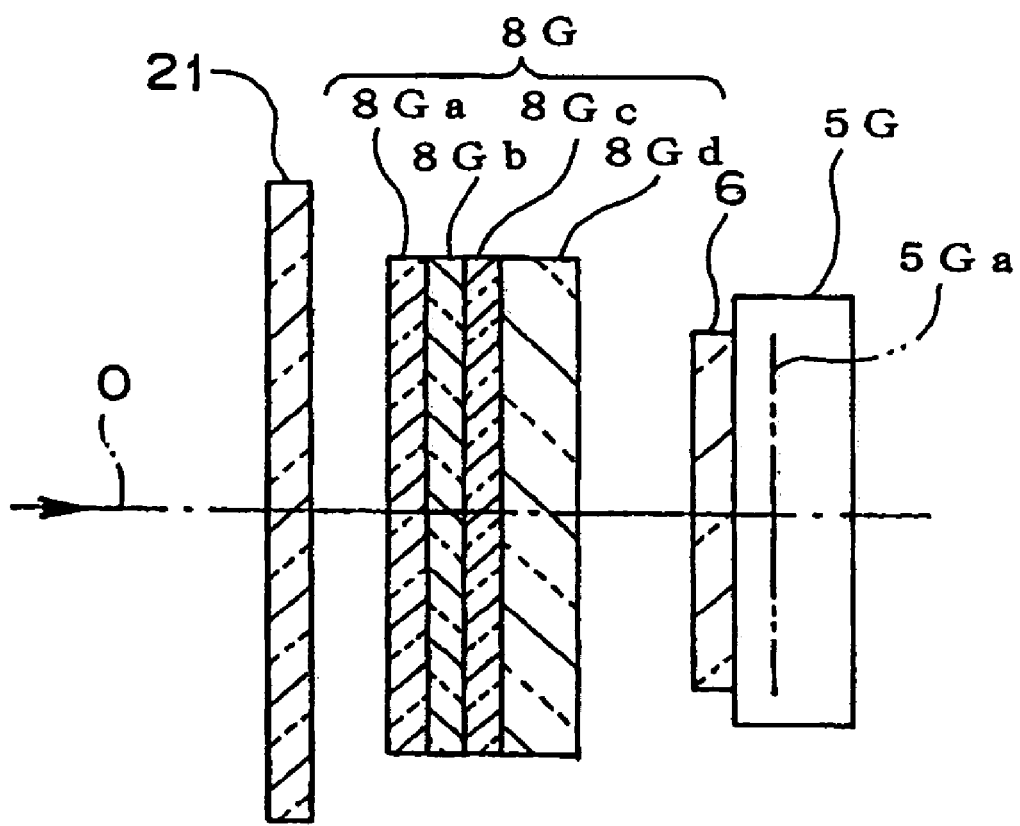
FIG. 14 is a detailed illustration of an optical system of an image pickup unit to be applied to a first camera body of the digital camera of FIGS. 9A and 9B.
Figure 15:
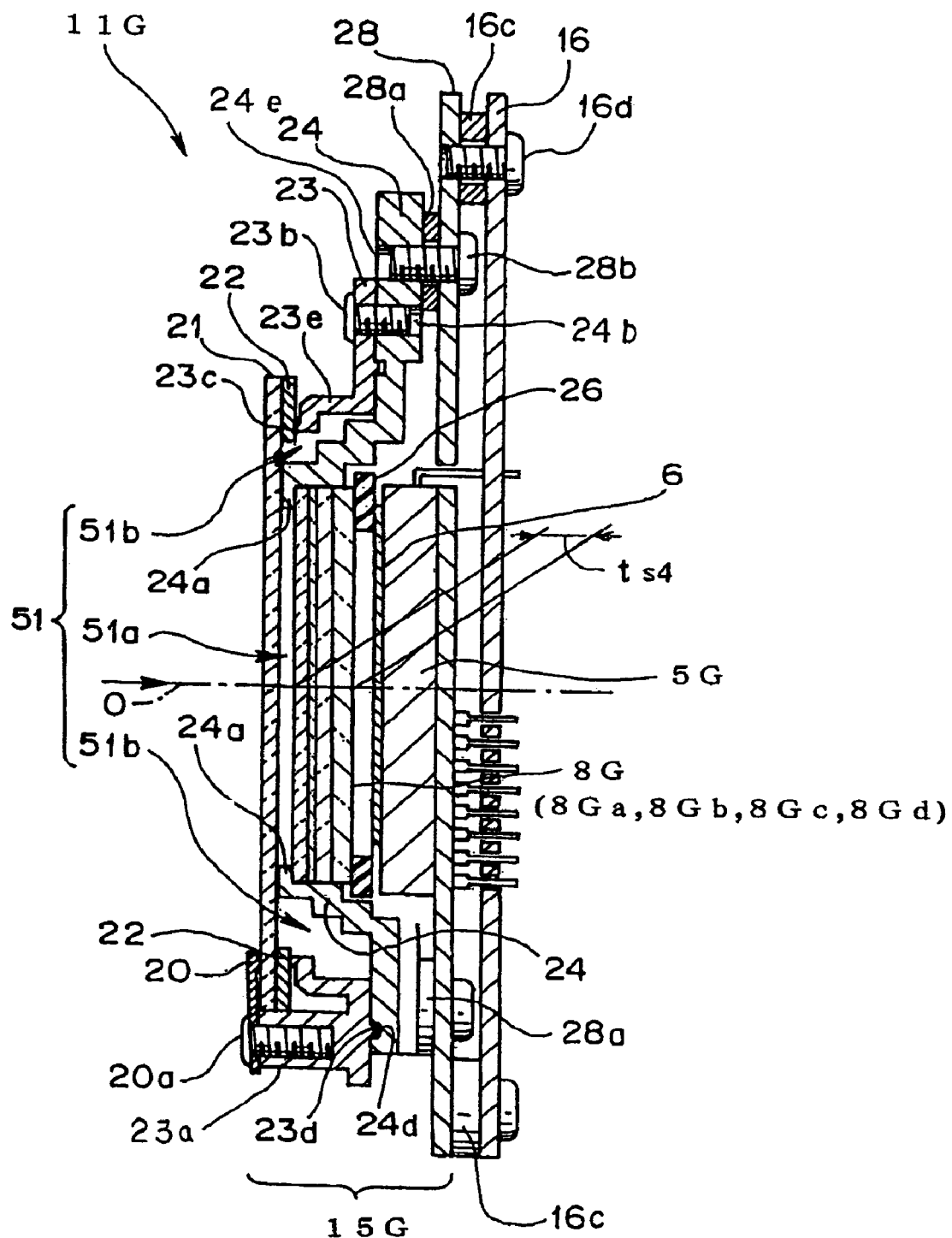
FIG. 15 is an enlarged sectional illustration of an image pickup unit to be applied to a first camera body of the digital camera of FIGS. 9A and 9B.

FIG. 14 is a schematic diagram showing details of an optical system of the image pickup unit 15G in the first camera body 11G. FIG. 15 is an enlarged vertical sectional diagram of the image pickup unit 15G.

As shown in FIG. 14, the protection glass 6 is provided in front of the image pickup element 5G. Furthermore, the optical LPF 8G and the dust-preventive filter 21 are disposed further in front of the image pickup element 5G.

The optical LPF 8G includes, on the front side thereof, a stack of a crystal plate 8Ga, an infrared absorbing glass 8Gb, a crystal plate 8Gc and a crystal plate 8Gd as previously discussed. The double refraction direction (angle of rotation) of the crystal plate 8Ga is −45°. The double refraction direction of the crystal plate 8Gc is +45°. The double refraction direction of the crystal plate 8Gd is 0°.

Each of the crystal plates 8Ga and 8Gc has a thickness corresponding to the pixel pitch of about 7 μm of the image pickup element 5G shown in FIG. 14. The crystal plate 8Gd has a thickness of the square root of the thickness of the crystal plates 8Ga and 8Gb. The optical LPF 8G having the above-described construction can prevent moiré from occurring when a subject luminous flux having passed through the interchangeable lens barrel 12 forms an image on the photoelectric conversion surface 5Ga of the image pickup element 5G.

The crystal plates 8Ga, 8Gc, and 8Gd and the infrared absorbing glass 8Gb have respectively refractive indices close to that of glass and have a total thickness ts4 (2.87 mm+0.5 mm). The photoelectric conversion surface 5Ga of the image pickup element 5G is positioned at the image forming position of a subject luminous flux based on the effective light path length in accordance with the refractive index and the thickness ts4. Therefore, a subject luminous flux captured by the lens barrel 12 can form an image properly on the photoelectric conversion surface 5Ga of the image pickup element 5G without the curvature-of-the-field aberration. More strictly speaking, the thickness of the protection glass 6 and dust-preventive filter 21 also contribute to the change in effective optical path length. However, the protective glass 6 and the dust-preventive filter 21 have the same thickness in each of the first camera body and the second camera body. Therefore, the effective optical path length in accordance with the protective glass 6 and dust-preventive filter 21 do not differ between the first camera body and the second camera body.

On the other hand, when the protection glass 6 and the dust-preventive filter 21 have different thicknesses and/or materials between the first camera body and the second camera body, the curvature-of-the-field aberration is corrected by changing the thickness or the material of the compensating optical unit in accordance with the change in the effective optical path length based on the differences.

Figure 16:
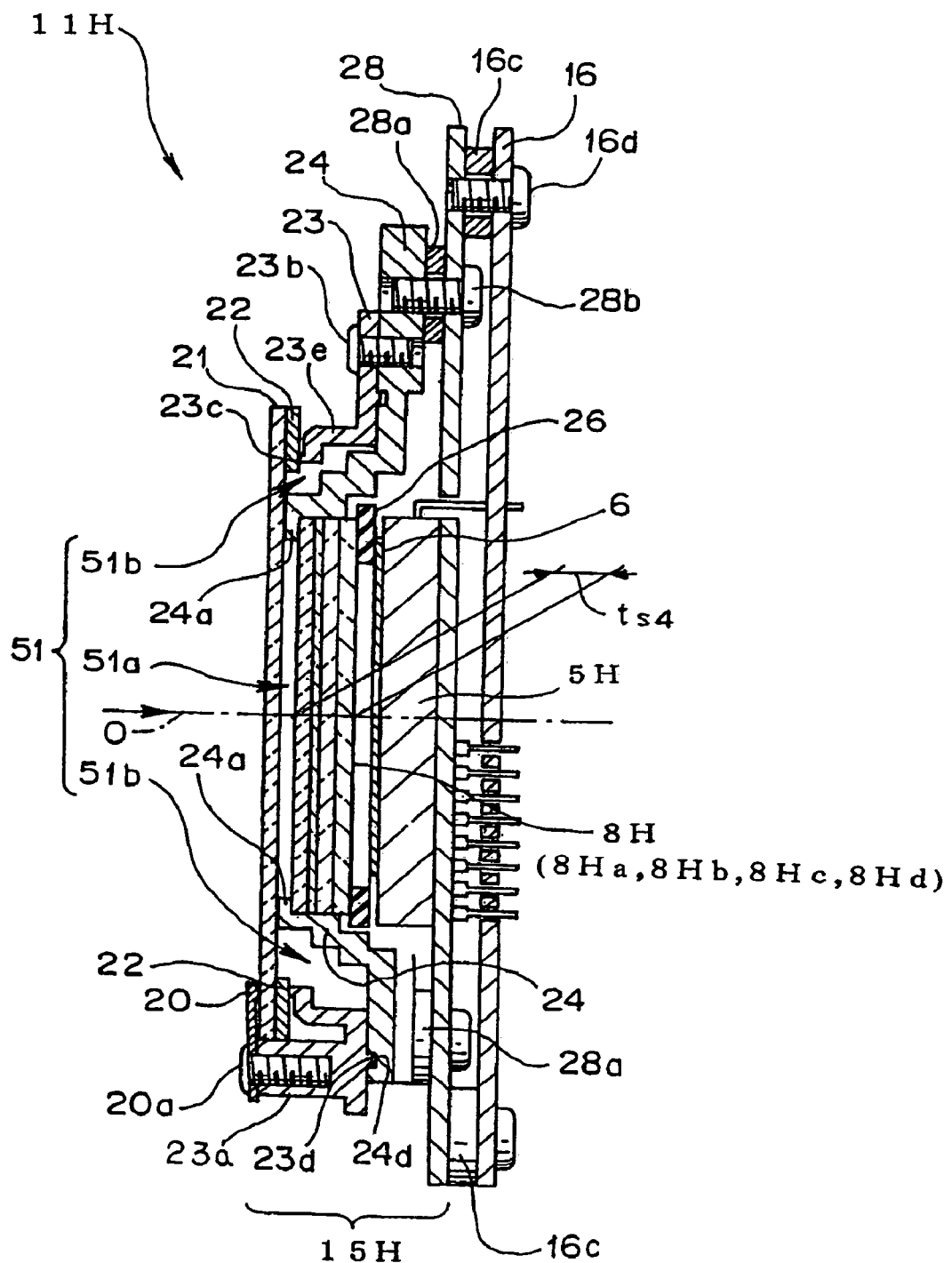
FIG. 16 is an enlarged sectional illustration of an image pickup unit to be applied to a second camera body of the digital camera of FIGS. 9A and 9B.

The second camera body 11H includes the image pickup element 5H and the optical LPF 8H in an image pickup unit 15H while the first camera body 11G includes the image pickup element 5G and the optical LPF 8G in the image pickup unit 15G, as shown in FIG. 13. The remaining structure of the second camera body 11H is identical to the first camera body 11G. FIG. 16 is an enlarged longitudinal sectional view of the image pickup unit 15H in the second camera body 11H.

The image pickup element 5H is of the same 4/3 type as the image pickup element 5G in size, but has a pixel pitch δ1 (about 5 μm) as a second pixel pitch different from the standard pixel pitch δ0 (about 7 μm). The distance from the photoelectric conversion surface 5Ha of the image pickup element 5H to the camera-side mount surface 3a (see FIG. 9B) is equal to the distance from the photoelectric conversion surface 5Ga to the camera-side mount surface 3a (see FIG. 9A).

As previously discussed with reference to FIG. 9B, the optical LPF 8H includes, from the front thereof, the crystal plate 8Ha having a double refraction direction (angle of rotation) of 0°, the infrared light absorbing glass 8Hb, the crystal plate 8Hc serving as a depolarization plate with no ray splitting action, and the crystal plate 8Hd having a double refraction direction of 90°. Theses members are bonded together using an optical adhesive agent. Each of the crystal plates 8Ha and 8Hd has a thickness for double refracting the subject luminous flux in accordance with the pixel pitch δ1 of the image pickup element 5H. The infrared light absorbing glass 8Hb is made of the same material that fabricates the infrared absorbing glass 8Gb in the first camera body 11G. The infrared light absorbing glass 8Hb is equal in both thickness and refractive index with the infrared absorbing glass 8Gb.

The dust-preventive filter 21 and the protection glass 6, arranged in front of the optical LPF 8H and the image pickup element 5H, respectively, are made of the same material as the counterparts in the first camera body 11G. The dust-preventive filter 21 and the protection glass 6 are also equal in thickness and refractive index with the respective counterparts in the first camera body 11G.

The optical LPF 8H, the dust-preventive filter 21, and the protection glass 6 form the second optical unit of the second camera body 11H. In the second optical unit, the infrared light absorbing glass 8Hb, the dust-preventive filter 21, and the protection glass 6 are identical to those used in the first optical unit. By adjusting the thickness of the crystal plate 8Hc serving as the depolarization plate, the thickness of the optical LPF 8H is adjusted to be equal to the thickness ts4 of the optical LPF 8G.

Therefore, a luminous flux passing through the interchangeable lens barrel 12 is precisely formed as an image in an image-forming position without deviation on the photoelectric conversion surface 5Ha of the image pickup unit 15H in a state free from the curvature of the field.

The depolarization plate can be arranged separately from the optical LPF 8H. The same polarization effect can be achieved by thickening one of the infrared light absorbing glass 8Hb, the protection glass 6, and/or the dust-preventive filter 21.

If the pixel pitch δ1 of the image pickup element 5H of the second camera body 11H is larger than a pixel pitch δ0 of 7 μm, in other words, if the number of pixels of the image pickup element 5H is smaller than the number of pixels of the image pickup element 5G, an LN element is used as the optical LPF 8H so as not to increase the thickness of the optical filter. As shown in FIG. 18, the LN element becomes significantly thin because of the double refraction property thereof as shown in FIG. 18 as the pixel pitch becomes larger. Since the thickness of the LN element is still 0.1 mm or more, the LN element is manufacturable. An optical compensating optical glass plate having a thickness compensating for a thinness of the filter created by replacement of the optical LPF 8H constituting the LN element is bonded to the optical LPF 8H. The thickness of the optical compensating element, however, needs to be determined taking into consideration a difference in refractive index between the LN element and crystal. Alternatively, to compensate for a thinness of the optical LPF constituting the LN element, a crystal plate serving as a depolarization plate may be bonded to the optical LPF 8H.

The image of the subject luminous flux is thus precisely formed on the photoelectric conversion surface 5Ha of the image pickup element 5H (see FIG. 9B), the image pickup element 5H being arranged at the same position as the image pickup element 5G. The optical LPF 8G in the first camera body 11G is the thickest of the other optical LPFs to be mounted in the second camera body 11H and other non-standard camera bodies.

In the digital camera system of the third embodiment, the first camera body 11G as the standard camera body housing the image pickup element 5G and the second camera body 11H housing the image pickup element 5H different in pixel pitch from the image pickup element 5G, use the optical LPF 8G and the optical LPF 8H, respectively, so that the subject luminous flux is double refracted in accordance with the respective pixel pitches if the interchangeable lens barrel 12 having the same specifications is mounted. The crystal plate 8Hc serving as a depolarization plate is installed in the optical LPF 8H on the second camera body to correct a deviation in image-forming position due to a smaller total thickness of the crystal plates 8Ha and 8Hd than the total thickness of the crystal plates 8Ga, 8Gc, and 8Gd. The installation of the crystal plate 8Hc causes the image of the subject luminous flux to be precisely formed on the photoelectric conversion surface of the image pickup element 5H in a state free from the curvature of the field.

The crystal plate 8Hc serving as the depolarization plate in the second camera body 11H has a thickness that compensates for a thinness of the LN element. The space occupied by the image pickup unit 15G in the first camera body 11G is not different from the space occupied by the image pickup unit 15H in the second camera body 11H. The standardization of the structure of the camera bodies is thus facilitated.

In accordance with the third embodiment, the standard pixel pitch δ0 is 7 μm. The setting method of the standard pixel pitch is described below.

The thickness of the optical low-pass filter (LPF) is determined depending on the pixel pitch. Given the same pitch, however, the thickness of the optical LPF is also determined depending on the material of the optical LPF. As shown in FIG. 18, the thickness of the optical LPF significantly changes depending on whether the optical LPF is made of crystal as a first material or an LN element as a second material. The number of pixels shown in FIG. 18 is that of a 4/3 type image pickup element.

To miniaturize the camera, a thinner optical LPF is preferable. However, an excessively thin optical LPF is not preferable because of manufacturing difficulty and possible damage. For example, an LN element working with the image pickup element having a pixel pitch δ of about 6 to 7 μm as shown in FIG. 18 has a thickness of 0.1 mm or less. With such a thickness, the optical LPF cannot be manufactured of the LN element.

The pixel pitch greater than a pixel pitch corresponding to a minimum thickness with which the LN element as the second material is manufacturable is set as a standard pixel pitch. By manufacturing the optical LPF corresponding to the standard pixel pitch of crystal as the first material, the thickness of the optical LPF can be minimized among camera bodies having various pixel pitches.

As shown in FIG. 18, for a camera body with an image pickup element having a pixel pitch smaller than the standard pixel pitch, an optical LPF thinner than an optical LPF made of crystal corresponding to the standard pixel pitch is manufactured of the first material of the optical LPF corresponding to the standard pixel pitch. Since the optical LPF is set to be thinner than the optical LPF corresponding to the standard pixel pitch, the depolarization plate is used as an optical compensating element to compensate for variation in effective optical path length.

As shown in FIG. 18, for a camera body with an image pickup element having a pixel pitch greater than the standard pixel pitch, an optical LPF manufactured of the first material becomes thicker than the optical LPF corresponding to the standard pixel pitch. The effective optical path length cannot be compensated for. In accordance with the standard pixel pitch, the LN element manufactured of the second material can be used. Even if the optical LPF is manufactured of the LN element, the resulting optical LPF can be set thinner than the optical LPF corresponding to the standard pixel pitch as shown in FIG. 18. The effective optical path length can be compensated for by using the depolarization plate as the optical compensating plate.

The standard pixel pitch is set to be equal to or larger than a pixel pitch with which a minimum thickness optical LPF manufactured of the second material can work. Regardless of a camera body with an image pickup element having a pixel pitch larger than the standard pixel pitch and a camera body with an image pickup element having a pixel pitch smaller than the standard pixel pitch, a variation in the effective optical path length due to a variation in the thickness of the optical LPF can be compensated for by the depolarization plate as the optical compensating plate.

If the pixel pitch is set to be equal to a pixel pitch with which an optical LPF having a minimum possible thickness manufactured of the second material works, the camera system compatible with camera bodies with various image pickup elements different in pixel pitch is thus provided.

The number of pixels of the image pickup element in the digital camera is typically stepwise set, for example, 300 million pixels, 400 million pixels, 500 million pixels. The standard pixel pitch may be set to be slightly smaller than a pixel pitch with which an optical LPF manufactured of the second material and having a minimum possible thickness works. More specifically, it is sufficient if an optical LPF corresponding to a pixel pitch of the image pickup element having the number of pixels smaller than in the standard camera body (i.e., with a larger pixel pitch) is manufactured of the second material.

The standard pixel pitch data thus obtained serves as a design standard.

In accordance with the third embodiment, each of the interchangeable lenses having the same specifications can be attached to another camera body mounting the image pickup element having a different pixel pitch. Each digital camera thus captures an image with optical aberrations including the curvature of the field, spherical aberration, and astigmatism, appropriately corrected. A lens-interchangeable camera with the same component arrangement incorporated around the image pickup element in different camera bodies is thus provided. Even if any of the optical elements such as the dust-preventive filter, the infrared absorbing glass, the protection glass for the image pickup element, and the optical low-pass filter is modified in material (namely, refractive index is modified) or the optical element is removed, the lens-interchangeable digital camera appropriately compensates for a variation in the effective optical path length. The interchangeable lens for use in such a camera system is also provided.

The present invention is not limited to the above-referenced embodiments. Various changes and modifications of the embodiments are possible without departing from the scope of the present invention. The above-referenced embodiments include a variety of elements, and any combination of the elements falls within the scope of the present invention.

All or part of the elements of the above-referenced embodiments in combination falls within the scope of the present invention.

What is claimed is:

1. A digital camera system having an interchangeable lens, and first and second camera bodies, each camera body allowing the interchangeable lens to be detachably attached thereto, the digital camera system comprising:

a first image pickup element arranged in the first camera body;

a first optical low-pass filter being arranged in front of the first image pickup element in the first camera body, a thickness of the first low-pass filter being determined based on a pixel pitch of the first image pickup element, the first optical low-pass filter including a first crystal plate with an angle of rotation of 45°, a first infrared absorbing glass having the same refractive index as that of crystal, a second crystal plate with an angle of rotation of −45° and a third crystal plate with an angle of rotation of 0°;

a second image pickup element arranged in the second camera body, the second image pickup element having a smaller pixel pitch than the first image pickup element; and a second optical low-pass filter being arranged in front of the second image pickup element in the second camera body, a thickness of the second low-pass filter being determined based on the pixel pitch of the second image pickup element, the second optical low-pass filter including a fourth crystal plate with an angle of rotation of 0°, a second infrared absorbing glass having the same refractive index as that of crystal, a crystal depolarization plate configured to provide only a depolarization effect and a fifth crystal plate with an angle of rotation of 90°, wherein a thickness of the crystal depolarization plate is set so that the second optical low-pass filter is approximately equal in effective optical path length to the first optical low-pass filter, and wherein, in the first optical low-pass filter, the first crystal plate, the first infrared absorbing glass, the second crystal plate and the third crystal plate are arranged in the aforesaid order from an object side, while in the second optical low-pass filter, the fourth crystal plate, the second infrared absorbing glass, the crystal depolarization plate and the fifth crystal plate are arranged in the last mentioned order from the object side.

2. A first camera body configured to enable an interchangeable lens optimized for a second camera body serving as a reference to be attached thereto, the reference camera body having a first image pickup element with a pixel pitch serving as a reference mounted thereto, the reference camera body having a first group of optical elements including a first crystal plate with an angle of rotation of 45°, a first infrared absorbing glass having the same refractive index as that of crystal, a second crystal plate with an angle of rotation of −45° and a third crystal plate with an angle of rotation of 0°, the first camera body comprising:

a second image pickup element different in pixel pitch from the first image pickup element arranged in the reference camera body; and a second group of optical elements arranged in front of the second image pickup element, the second group of optical elements having a thickness determined in accordance with the pixel pitch of the second image pickup element;

the second group of optical elements including a fourth crystal plate with an angle of rotation of 0°, a second infrared absorbing glass having the same refractive index as that of crystal, a crystal depolarization plate configured to provide only a depolarization effect and a fifth crystal plate with an angle of rotation of 90°, a thickness of the crystal depolarization plate being set so that the second group of optical elements is approximately equal in effective optical path length to the first group of optical elements, wherein, in the first group of optical elements, the first crystal plate, the first infrared absorbing glass, the second crystal plate and the third crystal plate are arranged in the aforesaid order from an object side, while in the second group of optical elements, the fourth crystal plate, the second infrared absorbing glass, the crystal depolarization plate and the fifth crystal plate are arranged in the last mentioned order from the object side.

* * * * *